United States Patent
Story, Jr. et al.

(10) Patent No.: US 9,792,027 B2
(45) Date of Patent: *Oct. 17, 2017

(54) MANAGING PLAYBACK OF SYNCHRONIZED CONTENT

(71) Applicant: Audible, Inc., Newark, NJ (US)

(72) Inventors: Guy Ashley Story, Jr., New York, NY (US); Bruce N. Israel, Bethesda, MD (US)

(73) Assignee: Audible, Inc., Newark, NJ (US)

(*) Notice: Subject to any disclaimer, the term of this patent is extended or adjusted under 35 U.S.C. 154(b) by 326 days.

This patent is subject to a terminal disclaimer.

(21) Appl. No.: 14/507,642

(22) Filed: Oct. 6, 2014

(65) Prior Publication Data

US 2015/0026577 A1     Jan. 22, 2015

Related U.S. Application Data

(63) Continuation of application No. 13/070,422, filed on Mar. 23, 2011, now Pat. No. 8,855,797.

(51) Int. Cl.
*G06F 17/00* (2006.01)
*G06F 3/0484* (2013.01)
(Continued)

(52) U.S. Cl.
CPC ...... *G06F 3/04847* (2013.01); *G06F 3/04842* (2013.01); *G06F 3/165* (2013.01);
(Continued)

(58) Field of Classification Search
None
See application file for complete search history.

(56) References Cited

U.S. PATENT DOCUMENTS

| 5,203,705 A | 4/1993 | Hardy et al. |
| 5,351,189 A | 9/1994 | Doi et al. |

(Continued)

FOREIGN PATENT DOCUMENTS

| CN | 103988193 A | 8/2014 |
| EP | 2689346 | 1/2014 |

(Continued)

OTHER PUBLICATIONS

Office Action in Canadian Application No. 2830622 dated Jun. 10, 2015.

(Continued)

*Primary Examiner* — Fan Tsang
*Assistant Examiner* — David Siegel
(74) *Attorney, Agent, or Firm* — Knobbe, Martens, Olson & Bear, LLP

(57) ABSTRACT

A computing device may provide a control interface that enables the user to manage the synchronized output of companion content (e.g., textual content and corresponding audio content). For example, the computing device may display a visual cue to identify a current location in textual content corresponding to a current output position of companion audio content. As the audio content is presented, the visual cue may be advanced to maintain synchronization between the output position within the audio content and a corresponding position in the textual content. The user may control the synchronized output by dragging her finger across the textual content displayed on the touch screen. Accordingly, the control interface may provide a highlight or other visual indication of the distance between the advancing position in the textual content and the location of a pointer to the textual content indicated by the current position of the user's finger.

21 Claims, 10 Drawing Sheets

(51) Int. Cl.
*G06F 3/16* (2006.01)
*G09B 5/06* (2006.01)

(52) U.S. Cl.
CPC ....... *G09B 5/062* (2013.01); *G10H 2220/096* (2013.01); *G10H 2240/325* (2013.01)

(56) References Cited

U.S. PATENT DOCUMENTS

| | | |
|---|---|---|
| 5,657,426 A | 8/1997 | Waters et al. |
| 5,737,489 A | 4/1998 | Chou et al. |
| 5,978,754 A | 11/1999 | Kumano |
| 6,076,059 A | 6/2000 | Glickman et al. |
| 6,208,956 B1 | 3/2001 | Motoyama |
| 6,256,610 B1 | 7/2001 | Baum |
| 6,260,011 B1 | 7/2001 | Heckerman et al. |
| 6,356,922 B1 | 3/2002 | Schilit et al. |
| 6,766,294 B2 | 7/2004 | MaGinite et al. |
| 6,912,505 B2 | 6/2005 | Linden et al. |
| 7,107,533 B2 | 9/2006 | Duncan et al. |
| 7,231,351 B1 | 6/2007 | Griggs |
| 8,106,285 B2 | 1/2012 | Gerl et al. |
| 8,109,765 B2 | 2/2012 | Beattie et al. |
| 8,131,545 B1 | 3/2012 | Moreno et al. |
| 8,131,865 B2 | 3/2012 | Rebaud et al. |
| 8,442,423 B1 | 5/2013 | Ryan et al. |
| 8,527,272 B2 | 9/2013 | Qin et al. |
| 8,548,618 B1 | 10/2013 | Story, Jr. et al. |
| 8,577,668 B2 | 11/2013 | Rosart et al. |
| 8,855,797 B2 | 10/2014 | Story, Jr. et al. |
| 8,862,255 B2 | 10/2014 | Story, Jr. et al. |
| 8,948,892 B2 | 2/2015 | Story, Jr. et al. |
| 9,037,956 B2 | 5/2015 | Goldstein et al. |
| 2002/0002459 A1 | 1/2002 | Lewis et al. |
| 2002/0007349 A1 | 1/2002 | Yuen |
| 2002/0041692 A1 | 4/2002 | Seto et al. |
| 2002/0116188 A1 | 8/2002 | Amir et al. |
| 2002/0184189 A1 | 12/2002 | Hay et al. |
| 2003/0061028 A1 | 3/2003 | Dey et al. |
| 2003/0083885 A1 | 5/2003 | Frimpong-Ansah |
| 2003/0115289 A1 | 6/2003 | Chinn et al. |
| 2004/0261093 A1 | 12/2004 | Rebaud et al. |
| 2005/0022113 A1 | 1/2005 | Hanlon |
| 2006/0148569 A1 | 7/2006 | Beck |
| 2007/0016314 A1 | 1/2007 | Chan et al. |
| 2007/0061487 A1 | 3/2007 | Moore et al. |
| 2007/0136459 A1 | 6/2007 | Roche et al. |
| 2007/0276657 A1 | 11/2007 | Gournay et al. |
| 2007/0282844 A1 | 12/2007 | Kim et al. |
| 2008/0005656 A1 | 1/2008 | Pang et al. |
| 2008/0027726 A1 | 1/2008 | Hansen et al. |
| 2008/0177822 A1 | 7/2008 | Yoneda |
| 2008/0294453 A1 | 11/2008 | Baird-Smith et al. |
| 2009/0047003 A1 | 2/2009 | Yamamoto |
| 2009/0136213 A1 | 5/2009 | Calisa et al. |
| 2009/0210213 A1 | 8/2009 | Cannon et al. |
| 2009/0222520 A1 | 9/2009 | Sloo et al. |
| 2009/0228570 A1 | 9/2009 | Janik et al. |
| 2009/0233705 A1 | 9/2009 | Lemay et al. |
| 2009/0276215 A1 | 11/2009 | Hager |
| 2009/0281645 A1 | 11/2009 | Kitahara et al. |
| 2009/0305203 A1 | 12/2009 | Okumura et al. |
| 2009/0319273 A1 | 12/2009 | Mitsui et al. |
| 2010/0042682 A1 | 2/2010 | Kaye |
| 2010/0042702 A1 | 2/2010 | Hanses |
| 2010/0064218 A1 | 3/2010 | Bull et al. |
| 2010/0070575 A1 | 3/2010 | Bergquist et al. |
| 2010/0225809 A1 | 9/2010 | Connors et al. |
| 2010/0279822 A1 | 11/2010 | Ford |
| 2010/0286979 A1 | 11/2010 | Zangvil et al. |
| 2010/0287256 A1 | 11/2010 | Neilio |
| 2011/0067082 A1 | 3/2011 | Walker |
| 2011/0087802 A1 | 4/2011 | Witriol et al. |
| 2011/0119572 A1 | 5/2011 | Jang et al. |
| 2011/0153330 A1 | 6/2011 | Yazdani et al. |
| 2011/0177481 A1 | 7/2011 | Haff et al. |
| 2011/0184738 A1 | 7/2011 | Kalisky et al. |
| 2011/0191105 A1 | 8/2011 | Spears |
| 2011/0231474 A1 | 9/2011 | Locker et al. |
| 2011/0246175 A1 | 10/2011 | Yi et al. |
| 2011/0288861 A1* | 11/2011 | Kurzweil ................ G09B 5/06 704/235 |
| 2011/0288862 A1 | 11/2011 | Todic |
| 2011/0296287 A1 | 12/2011 | Shahraray et al. |
| 2011/0320189 A1 | 12/2011 | Carus et al. |
| 2012/0030288 A1 | 2/2012 | Burckart et al. |
| 2012/0109640 A1 | 5/2012 | Anisimovich et al. |
| 2012/0150935 A1 | 6/2012 | Frick et al. |
| 2012/0166180 A1 | 6/2012 | Au |
| 2012/0197998 A1 | 8/2012 | Kessel et al. |
| 2012/0245721 A1 | 9/2012 | Story, Jr. et al. |
| 2012/0246343 A1 | 9/2012 | Story, Jr. et al. |
| 2012/0310642 A1 | 12/2012 | Cao et al. |
| 2012/0315009 A1 | 12/2012 | Evans et al. |
| 2012/0324324 A1 | 12/2012 | Hwang et al. |
| 2013/0041747 A1 | 2/2013 | Anderson et al. |
| 2013/0073449 A1 | 3/2013 | Voynow et al. |
| 2013/0073675 A1 | 3/2013 | Hwang et al. |
| 2013/0074133 A1 | 3/2013 | Hwang et al. |
| 2013/0130216 A1 | 5/2013 | Morton et al. |
| 2013/0212454 A1 | 8/2013 | Casey |
| 2013/0257871 A1 | 10/2013 | Goldstein et al. |
| 2014/0005814 A1 | 1/2014 | Hwang et al. |
| 2014/0039887 A1 | 1/2014 | Dzik et al. |
| 2014/0040713 A1 | 2/2014 | Dzik et al. |
| 2014/0223272 A1 | 8/2014 | Arora et al. |
| 2014/0250219 A1 | 9/2014 | Hwang |

FOREIGN PATENT DOCUMENTS

| | | |
|---|---|---|
| JP | 9-265299 | 10/1997 |
| JP | 2002-140085 | 5/2002 |
| JP | 2002-328949 | 11/2002 |
| JP | 2003-304511 | 10/2003 |
| JP | 2004-029324 | 1/2004 |
| JP | 2004-117618 | 4/2004 |
| JP | 2004-266576 | 9/2004 |
| JP | 2005-189454 A | 7/2005 |
| JP | 2007-522591 | 8/2007 |
| JP | 2007-249703 | 9/2007 |
| JP | 2010-250023 | 11/2010 |
| NZ | 532174 | 1/2007 |
| WO | WO 2006/029458 A1 | 3/2006 |
| WO | WO 2011/144617 A1 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Arar, Y., Blio E-Book Platform: No Reader (Yet), but Great Graphics, Jan. 7, 2010.
Beattie, V., et al., Reading Assistant: Technology for Guided Oral Reading, Scientific Learning, Apr. 10, 2012, 5 pages.
Dzik, S.C., U.S. Appl. No. 13/604,482, filed Sep. 5, 2012, entitled Identifying Corresponding Regions of Content.
Dzik, S.C., U.S. Appl. No. 13/604,486, filed Sep. 5, 2012, entitled Selecting Content Portions for Alignment.
Dzik, S.C., U.S. Appl. No. 13/662,306, filed Oct. 26, 2012, entitled Content Presentation Analysis.
Feature: Synched Audio and Text, Enhanced Editions, Aug. 31, 2009, last accessed Nov. 15, 2012, available at http://en-hanced-editions.com/blog/2009/08/enhanced-editions-features-exclusive-soundtracks-and-extracts/.
Hwang, D.C., et al., U.S. Appl. No. 13/536,711, filed Jun. 28, 2012, entitled Pacing Content.
International Search Report issued in connection with International Patent Application No. PCTUS12/30186 mailed on Jun. 20, 2012, 12 pages.

(56) References Cited

OTHER PUBLICATIONS

International Search Report issued in connection with International Patent Application No. PCT/US12/30198 mailed on Jun. 20, 2012, 16 pages.
International Preliminary Report on Patentability issued in connection with International Patent Application No. PCT/US12/30198 mailed on Jan. 30, 2014, 8 pages.
Office Action in Japanese Application No. 2014-501257 dated Aug. 25, 2014.
Office Action in Japanese Application No. 2014-501254 dated Oct. 14, 2014.
International Search Report and Written Opinion in PCT/US2013/042903 mailed Feb. 7, 2014.
International Preliminary Report on Patentability in PCT/US2013/042903 mailed Dec. 2, 2014.
International Search Report issued in connection with International Application No. PCT/US13/53020 mailed on Dec. 16, 2013.
International Search Report and Written Opinion in PCT/US2014/014508 mailed Jun. 25, 2014.
Levinson, S.E., et al., Continuous Speech Recognition from a Phonetic Transcription, Acoustics, Speech, and Signal Processing, Apr. 1990, pp. 190-199.
Roub, P., I'll Buy an E-book Reader When . . . , Nov. 16, 2007, available at: http://roub.net/blahg/2007/11/16/ill-buy-an-eboo/ (accessed Sep. 6, 2012), 2 pages.
Vignoli, F., et al., A Text-Speech Synchronization Technique With Applications to Talking Heads, Auditory-Visual Speech Processing, ISCA Archive, Aug. 7-10, 1999.
Weber, F.V., U.S. Appl. No. 13/531,376, filed Jun. 22, 2012, entitled Modelling Expected Errors for Discriminative Training.
Extended Search Report in European Application No. 12761404.8 dated Jan. 26, 2015.
International Preliminary Report issued in connection with International Application No. PCT/US13/53020 mailed on Feb. 12, 2015.
Extended Search Report in European Application No. 12761104.4 dated Apr. 20, 2015.
Office Action in Canadian Application No. 2830906 dated Mar. 17, 2015.
Office Action in Japanese Application No. 2014-501257 dated Apr. 6, 2015.

* cited by examiner

MANAGING PLAYBACK OF SYNCHRONIZED CONTENT

CROSS-REFERENCE TO RELATED APPLICATION

This application is a continuation of U.S. patent application Ser. No. 13/070,422, entitled MANAGING PLAYBACK OF SYNCHRONIZED CONTENT, and filed Mar. 23, 2011, the entirety of which is incorporated herein by reference.

BACKGROUND

Electronic book ("eBook") readers, notebook computers, mobile phones with more advanced computing ability and connectivity ("smart phones"), and other devices for the presentation of digital information have ushered in a revolution in the dissemination and consumption of content. In one application, eBooks comprising text, pictures, and other digital representations of printed content have minimized many of the costs of traditional publishing and physical book distribution.

In addition to advantages in production and distribution, eBooks and other forms of digital content hold many benefits for the end user of content. Devices capable of displaying eBooks and other visual information are often more portable and convenient than physical copies. In some devices, the user can additionally provide, or associate, additional information with the content, such as annotations, bookmarks, excerpts, etc., during the presentation of the content. Still further, a display device may be associated with a digital audio player component that has obtained an audio representation of the original content (e.g., an audio book that can be audibly rendered via headphones/speakers) from the same or a different source. In some devices, the audio content can be played back and synchronized with the presentation of the visual content so as to provide a cohesive visual and auditory experience for the user.

Depending on the capabilities and functionality associated with each respective device and the specific nature of the content, a user may access visual content through a myriad of different interfaces provided, or otherwise associated, with a specific device (e.g., a touch screen display on a wireless eBook reader). Although many of these devices provide the capability for audio output, many lack a simple and intuitive interface for controlling the synchronized playback of visual and audio content.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
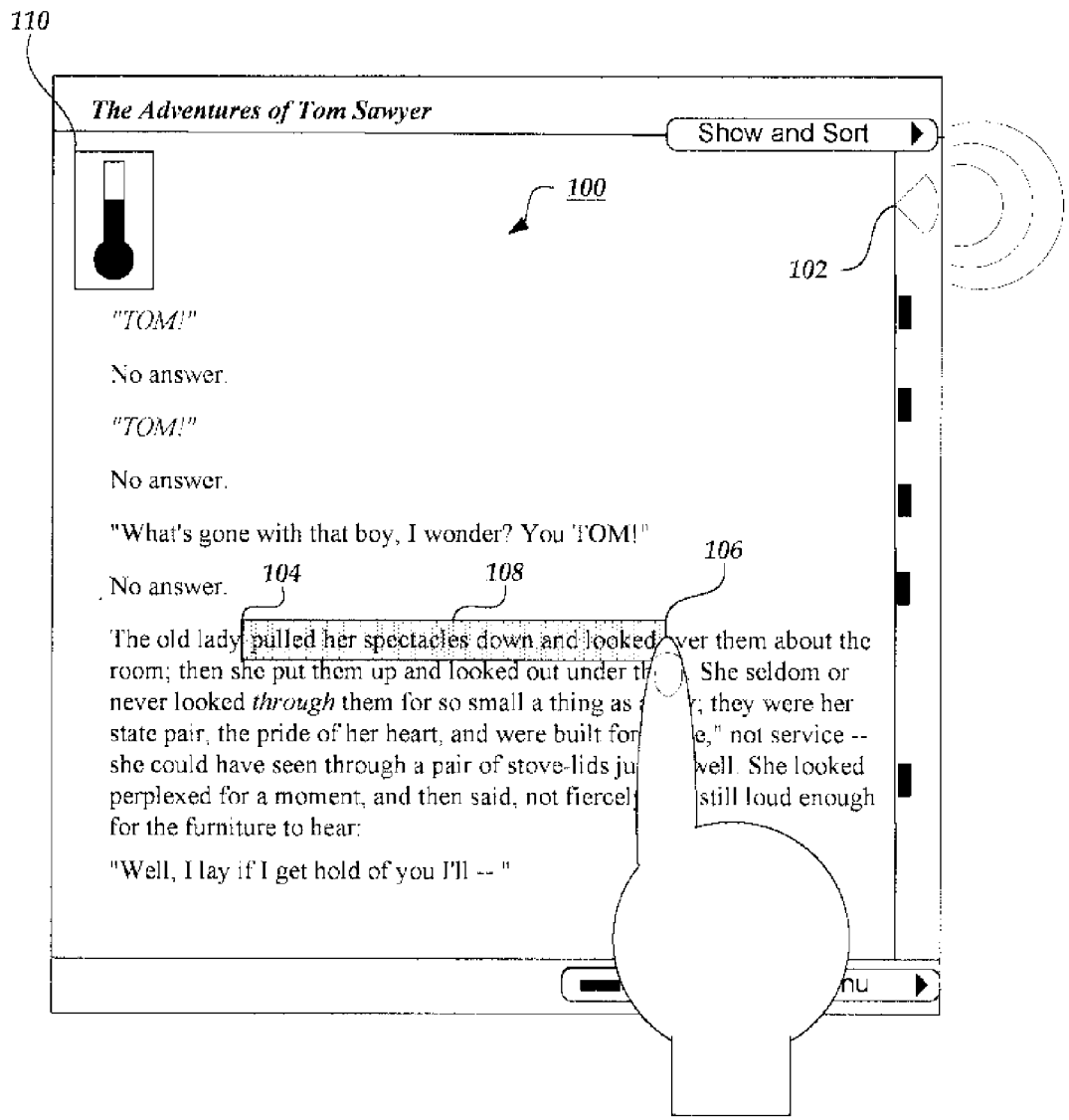
FIG. 1 depicts an illustrative control interface that may be used to manage synchronized playback of content.

Generally described, aspects of the present disclosure relate to the synchronized output of content on a computing device. Specifically, systems and methods are disclosed for controlling the playback of synchronized content through the movement of a cursor, pointer, or other input. For example, a user may utilize a computing device such as an eBook reader in order to obtain access to companion content (e.g., an eBook and a corresponding audio book) that can be synchronously rendered. Illustratively, the user may first obtain a copy of an eBook, such as a digital representation of *The Adventures of Tom Sawyer*, stored on the eBook reader. At the same or a different time, the user may obtain a copy of the audio book version of *The Adventures of Tom Sawyer* and store it on the same device. In some embodiments, after identifying the companion content on the eBook reader, a content management system can cause content synchronization information corresponding to the companion content to be transmitted to the device. With the companion content and the content synchronization information available on the same device, the eBook reader can synchronously render the companion content to provide the user with an enhanced experience. An embodiment of a system for obtaining synchronization information for companion content may be found in U.S. patent application Ser. No. 13/070,313, filed Mar. 23, 2011, entitled "SYNCHRONIZING DIGITAL CONTENT," which is hereby incorporated by reference in its entirety. For instance, the user may listen to an audio recording of *The Adventures of Tom Sawyer* while viewing the corresponding text, which can be highlighted, underlined, or otherwise modified to correspond to a corresponding position in the audio recording. The synchronous rendering experience may also include, for example, automatic page turning synchronized with audio playback and/or aligning search results in one format with a rendering position of the other format, with subsequent synchronous rendering starting at the search result position.

The eBook reader device may further provide a control interface that enables the user to manage the synchronized output of the companion content. For example, in one embodiment of a control interface, the eBook may display a visual cue (e.g., a cursor) to identify a current location in textual content corresponding to a current output position of companion audio content. As the audio content is presented (i.e., as it "plays back"), the visual cue may be advanced to maintain synchronization between the output position within the audio content and a corresponding position in the textual content. The position in the textual content corresponding to the advancing output position of the audio content may be referred to herein as the advancing position in the textual content. In one embodiment, the user may control the synchronized output by dragging her finger across the textual content displayed on the touch screen. Accordingly, the control interface may provide a highlight or other visual indication of the distance between the advancing position in the textual content and the location of a pointer to the textual content indicated by the current position of the user's finger. For purposes of the present disclosure, the distance between an advancing position in the textual content and the location of a pointer to the textual content will be referred to herein as a lead interval. In one embodiment, the lead interval may correspond to a length of time required to output audio content corresponding to the textual content between the advancing position in the textual content and the location of a pointer to the textual content at a normal or intended rate (e.g., a rate specified by the user or predefined by the computing device or audio content provider). In various other embodiments, the lead interval may correspond to a distance, or a number of words, letters, syllables, phonemes, spaces, sentences, paragraphs, columns, lines, rows, chapters, stanzas, sections, or other natural or predefined visual or textual feature of the textual content between the advancing position in the textual content and the location of a pointer to the textual content. Based on the lead interval, the eBook reader may change the speed at which the audio content is output and the corresponding position in the textual content advances.

Although the preceding description refers to an eBook reader, any computing device capable of presenting content to a user may be used in accordance with the present disclosure. The computing device can include, but is not limited to, a laptop, personal computer, a tablet computer, personal digital assistant (PDA), hybrid PDA/mobile phone, mobile phone, electronic book reader, digital media player, integrated components for inclusion in computing devices, appliances, electronic devices for inclusion in vehicles or machinery, gaming devices, and the like. These computing devices may be associated with any of a number of visual, tactile, or auditory output devices, and may be associated with a number of devices for user input, including, but not limited to, keyboards, mice, trackballs, trackpads, joysticks, input tablets, trackpoints, touch screens, remote controls, game controllers, motion detectors and the like.

In addition, content can refer to any data that can be directly or indirectly accessed by a user, including, but not limited to, multi-media data, digital images, digital video, displayable text, audio data, eBooks, electronic documents, electronic publications, computer-executable code, portions of the above, and the like. Specifically, references to textual content or other visually displayed content should be understood to include any form of visual or tactile content, including text, images, charts, graphs, slides, maps, Braille, embossed images, or any other content capable of being displayed in a visual or tactile medium. Moreover, references to sequential content can include any content that can be output in a sequential manner, including an eBook, image slideshow, presentation slides, displayable text, audio data, video data, and the like. Content may be stored on a computing device, may be generated by the computing device, or may be streamed across a network for display or output on the computing device. Moreover, content may be obtained from any of a number of sources, including a network content provider, a local data store, computer readable media, a content generation algorithm (e.g., a text-to-speech algorithm) running remotely or locally, or through user input (e.g., text entered by a user). A first content (e.g., audio content) and a second content (e.g., textual content) that can be synchronized may be referred to as companion content. Each item of companion content may be obtained, stored, or delivered from any one or combination of sources as described above. For example, in one embodiment a computing device may locally store a text of *The Adventures of Tom Sawyer* obtained from a local library, and may stream companion audio content from a third party commercial audio book provider.

In one embodiment, for each pair of companion content, content synchronization information associated with the companion content can be generated, transmitted, and/or obtained via computing devices in a communication network. The content synchronization information can include any data related to the synchronous presentation of the first content and the second content, so as to enable one or more computing devices to synchronously present the companion content. Content synchronization information can include reference points mapping portions of the first content to corresponding portions of the second content. In a specific example, content synchronization information can include data that can be used to map a segment of text (e.g., a word, line, sentence, etc.) to a timestamp of a corresponding audio recording. The content synchronization information can also include information related to the relative progress of the presentation, or a state of presentation of the digital representation of the content. The synchronous presentation of the companion content can vary as a function of the capabilities and/or configuration of the device (e.g., an eBook reader vs. a mobile phone) and/or the formats of the content in the content pair (e.g., a digital publication and an audio recording vs. a video and an audio recording). Accordingly, the content synchronization information can be generated in a variety of formats, versions, etc. In addition, the content synchronization information can include any combination of features or data used to synchronize content disclosed in U.S. patent application Ser. No. 12/273,473 ("the '473 application"), filed Nov. 18, 2008, entitled "SYNCHRONIZATION OF DIGITAL CONTENT," and U.S. patent application Ser. No. 13/070,313, filed Mar. 23, 2011, entitled "SYNCHRONIZING DIGITAL CONTENT, ("the '313 application") each of which is hereby incorporated by reference in its entirety.

With reference to FIG. 1, an illustrative control interface 100 is depicted that may be used to manage synchronized output and display of companion content (e.g., audio content and textual content). For purposes of illustration, the control interface 100 may be generated for display on a computing device 200 such as the computing device 200 discussed with reference to FIG. 2 below. The computing device 200 may include one or more output devices 222 represented in FIG. 1 by icon 102 that are capable of audio output. Such output devices may include one or more speakers or any of a variety of digital or analog audio capable output ports, including, but not limited to, headphone jacks, ¼ inch jacks, XLR jacks, Bluetooth links, stereo jacks, RCA jacks, optical ports or USB ports.

In the illustrated example, the control interface 100 includes a representation 104 of an advancing position in textual content. This representation 104 of an advancing position may correspond to a current position in audio content as the audio content is played back through the one or more output devices 222 of the computing device 200. Illustratively, the representation 104 of an advancing position may correspond to the beginning of a block 108 of highlighted text. In other embodiments, the representation 104 of an advancing position may take any form, and may be displayed visually or through a tactile interface. For example, the representation 104 of an advancing position in the textual content may be indicated by a visible or tactile cursor, line, selection, animation, or any other type of emphasis.

The representation 104 of an advancing position in the textual content may be updated as the current position in the companion audio content advances during playback in order to maintain synchronization between the companion textual and audio content. In one embodiment, the representation 104 of an advancing position in the textual content may indicate the beginning, the end, or any other location within a word or sentence currently being output by the output device(s) 222. In another embodiment, a representation 104 of an advancing position in the textual content may indicate a syllable of a word currently being output by the output device(s) 222. In still further embodiments, a representation 104 of an advancing position in the textual content may indicate an entire word or sentence, or may indicate a word or sentence a fixed distance away from a word, syllable, or sentence being currently being output by the output device(s) 222.

The control interface 100 may additionally include a representation 106 of a location of a pointer to the textual content. In the illustrated example, the representation 106 of a location of a pointer to the textual content is represented by an end of a block 108 of highlighted textual content. In various other embodiments, the control interface 100 may display the representation 106 of the location of the pointer to the textual content through any visual or tactile cue, cursor, or other type of emphasis. The location of the pointer to the textual content represented by representation 106 may be obtained from one or more user input devices 224 of the computing device 200 as described below in reference to FIG. 2. In the illustrated example, the location of the pointer to the textual content corresponding to the representation 106 is obtained through a touch screen display of the computing device 200 that tracks the location of a user's finger. In various other embodiments, input devices 224 may include, but are not limited to, keyboards, mice, trackballs, trackpads, joysticks, input tablets, trackpoints, touch screens, remote controls, game controllers, motion detectors (e.g., accelerometers, gravimeters, infrared sensors, microwave sensors, ultrasonic sensors, video cameras, etc.) and the like. In various embodiments, obtaining a current location of the pointer referencing the textual content from the input device may include obtaining a location corresponding to any one of a word, syllable, letter, sentence, line, paragraph, chapter, stanza, section, column, etc. in the textual content.

The control interface 100 may include a block 108 of highlighted textual content or other indicator to represent a lead interval such as the interval between the representation 104 of the advancing position in the textual content and the representation 106 of the location of the pointer to the textual content. In one embodiment, a formatting change, a change in an attribute of audio or other content being output, or any other visual, aural, or tactile cue may be used to represent the lead interval. In another embodiment, a lead interval may be represented as a numerical value or may be indicated by reproducing the textual content captured in the interval (e.g., the textual content within the block 108) at an alternate location on the screen.

As discussed above, the computing device 200 may change the speed at which synchronized companion audio and textual content are output and displayed based on the lead interval indicated by the block 108 of highlighted textual content. A particular speed at which audio content is output and the corresponding speed at which a pointer to companion textual content is advanced to maintain synchronization may together be referred to as a playback state. For the purposes of example, we will assume that the lead interval indicated by the block 108 of textual content corresponds to a length of time required to output audio content corresponding to the text contained in block 108 of textual content at a normal or suggested speed. In one embodiment, if the lead interval satisfies a certain threshold (e.g., exceeds a threshold and/or drops or remains below a threshold), the rate of audio output (and corresponding rate at which the pointer to the companion textual content advances) may proceed at normal speed. This output state may be referred to as a normal playback state. If the lead interval travels outside the first threshold (e.g., if the user jumps too far ahead in the textual content), the output speed of the audio content and corresponding rate of advance of the pointer to the companion textual content may increase. This accelerated output state may be referred to as a fast playback state, and may allow the user to fast forward through a section of the audio content and the companion textual content. If the lead interval satisfies a second threshold, the output speed of the audio content and corresponding rate of advance of the pointer to the companion textual content may increase even further. For the purpose of example, the very rapid output state may be referred to as a cue playback state, and may correspond to a very rapid or accelerated audio output state where only short fragments of the audio content are output in order to maintain intelligibility and allow the user to judge her location in the audio content. Although, for the purposes of example, the lead interval indicated by the block 108 of textual content and the thresholds demarking playback states are defined in terms of the time required to output audio content corresponding to the block 108 of textual content, in various embodiments lead intervals and thresholds may correspond to distances, or numbers of words, letters, syllables, phonemes, spaces, sentences, paragraphs, columns, lines, rows, chapters, stanzas, sections, or any other textual feature within the block 108 of textual content.

Referring again to FIG. 1, the control interface 100 may further include a playback transition indicator 110. This playback transition indicator 110 may provide a visual, tactile, or aural indication of a current playback state, and may further provide advance indication of an approaching point of transition between playback states, such as a threshold as discussed above. Illustratively, in the context of the above example, if the computing device 200 is in a normal playback state, the playback transition indicator 110 may provide an indication of how close the lead interval indicated by block 108 of textual content is to satisfying a threshold corresponding to a fast or cue playback state. The playback transition indicator 110 may include, but is not limited to a bar, a dial, a numerical value, a transparency effect or other visual animation, or any other visual, aural, or tactile indication of a user's nearness to a threshold or other playback state transition point.

In the example illustrated in FIG. 1, the playback transition indicator 110 is a thermometer bar that fills as the user increases the lead interval corresponding to the block 108 of textual content. When the interval approaches a threshold corresponding to a transition in playback state, such as a transition from a normal playback state to a fast playback state, the playback transition indicator 110 may fill to the top of the thermometer bar. In some embodiments, the interval approaching within a predefined distance of a threshold may trigger an additional visual, aural, or tactile effect, including but not limited to a change in the color of the playback transition indicator 110 or the block 108 of highlighted textual content, a change in size of the playback transition indicator 110, a visual animation or blinking effect applied to the playback transition indicator 110 or the block 108 of highlighted textual content, a vibration of the computing device 200, a change in an attribute of audio being output, a sound or any other indication that a change in playback state is near. One skilled in the relevant art will appreciate that the illustrative interface described above is provided for purposes of example only, and that embodiments of the interface may implement any number or combination of the features described with reference to FIG. 1. The particular combination or functionality of features comprising a control interface such as the illustrative control interface 100 of FIG. 1 may be predefined by a user or computing device 200, determined by a remote service, or dynamically determined by the computing device 200 based on past observations of user behavior. Control interface 100 may be implemented on any number of devices as described below with reference to FIG. 2.

Figure 2:
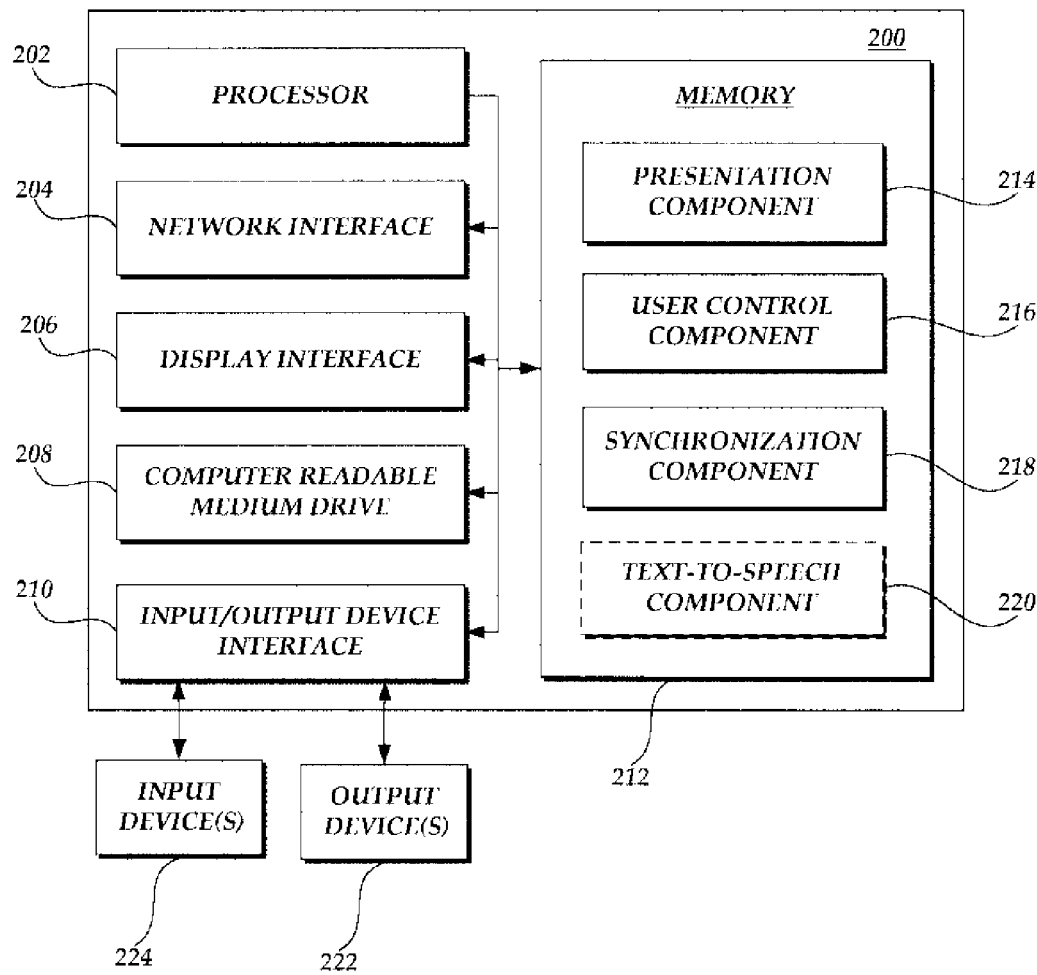
FIG. 2 is a block diagram depicting an illustrative embodiment of a computing device configured to implement synchronized playback of content.

FIG. 2 is a block diagram illustrating an embodiment of a computing device 200 configured to implement synchronized playback of content. The computing device 200 may have one or more processors 202 in communication with a network interface 204, a display interface 206, a computer readable medium drive 208, and an input/output device interface 210, all of which communicate with one another by way of a communication bus. The network interface 204 may provide connectivity to one or more networks or computing systems. The processor(s) 202 may thus receive information and instructions from other computing systems or services via a network. The processor(s) 202 may also communicate to and from memory 212 and further provide output information or receive input information via the display interface 206 and/or the input/output device interface 210. The input/output device interface 210 may accept input from one or more input devices 224, including, but not limited to, keyboards, mice, trackballs, trackpads, joysticks, input tablets, trackpoints, touch screens, remote controls, game controllers, heart rate monitors, velocity sensors, voltage or current sensors, motion detectors, or any other input device capable of obtaining a position or magnitude value from a user. The input/output interface may also provide output via one or more output devices 222, including, but not limited to, one or more speakers or any of a variety of digital or analog audio capable output ports, including, but not limited to, headphone jacks, ¼ inch jacks, XLR jacks, stereo jacks, Bluetooth links, RCA jacks, optical ports or USB ports, as described above. The display interface 206 may be associated with any number of visual or tactile interfaces incorporating any of a number of active or passive display technologies (e.g., electronic-ink, LCD, LED or OLED, CRT, projection, etc.) or technologies for the display of Braille or other tactile information.

Memory 212 may include computer program instructions that the processor(s) 202 executes in order to implement one or more embodiments. The memory 212 generally includes RAM, ROM and/or other persistent or non-transitory computer-readable media. Memory 212 may store a presentation component 214 for managing the output of information to a display and/or other output device(s) 222 via the display interface 206 and/or input/output interface 210. The memory 212 may further include a user control component 216 for managing and obtaining user input information received for one or more input device 224 via the input/output device interface 210. In one embodiment, the user control component 216 may additionally interpret user input information in order to change a playback state of companion content. Memory 212 may further store a synchronization component 218. In one embodiment, the synchronization component 218 may interpret a synchronization file obtained from a local or network storage location (not shown) in order to maintain synchronization between companion content. In one embodiment, the synchronization file contains content synchronization information associated with the companion content, and can be generated, transmitted, and/or obtained via computing devices in a communication network. The content synchronization information can include any data related to the synchronous presentation of the first content and the second content, so as to enable one or more computing devices to synchronously present companion content. Content synchronization information can include reference points mapping portions of the first content to corresponding portions of the second content. In a specific example, content synchronization information can include data that can be used to map a segment of text (e.g., a word, line, sentence, etc.) to a timestamp of a corresponding audio recording. The content synchronization information can also include information related to the relative progress of the presentation, or a state of presentation of the digital representation of the content. The synchronous presentation of the companion content can vary as a function of the capabilities and/or configuration of the device (e.g., an eBook reader vs. a mobile phone) and/or the formats of the content in the content pair (e.g., a digital publication and an audio recording vs. a video and an audio recording). Accordingly, the content synchronization information can be generated in a variety of formats, versions, etc. In addition, the content synchronization information can include any combination of features or data used to synchronize content disclosed in the '473 application and the '313 application, each of which was incorporated by reference herein in its entirety above.

In another embodiment, the synchronization component 218 may dynamically calculate or estimate synchronization information without requiring a synchronization file. For example, the memory 212 may include a text-to-speech component 220 that provides audio content corresponding to textual content without the necessity of obtaining prerecorded audio content, using any of a number of text-to-speech algorithms known in the art. In one embodiment, the text-to-speech component 220 may additionally calculate or estimate playback length for words or phrases to assist the synchronization component 218 in dynamically synchronizing textual content and audio content without a synchronization file.

Figure 3A:
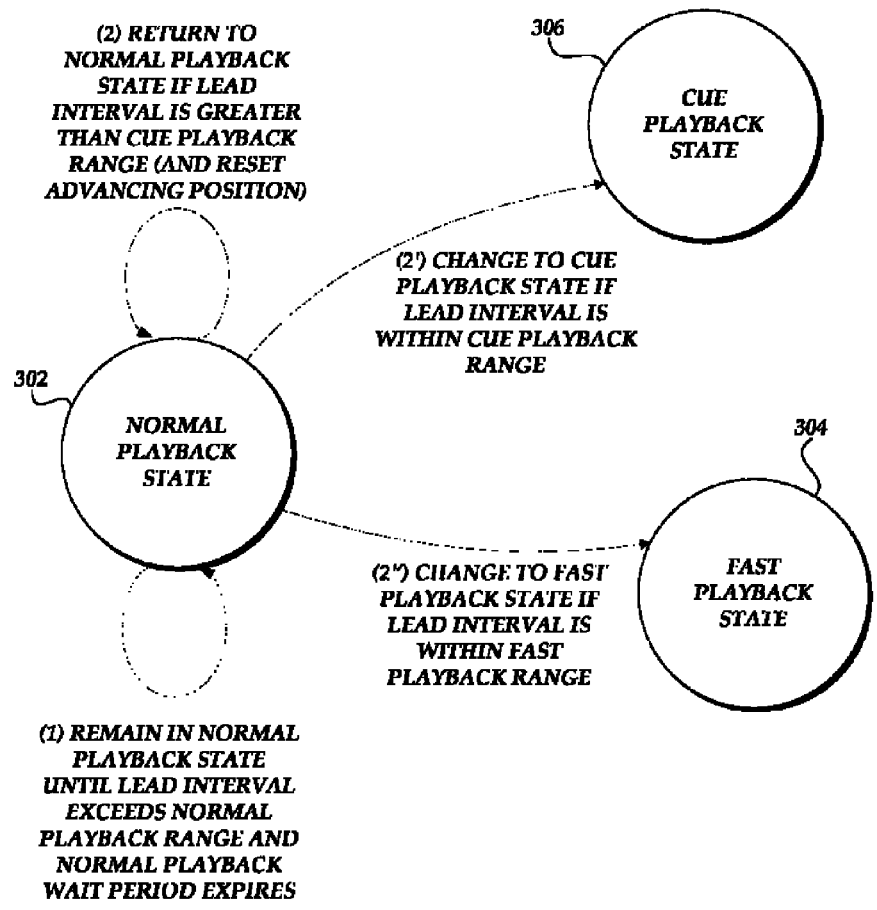
FIGS. 3A-3C are state diagrams depicting illustrative transitions between various playback states for the output of content on the device shown in FIG. 2.
Figure 3B:
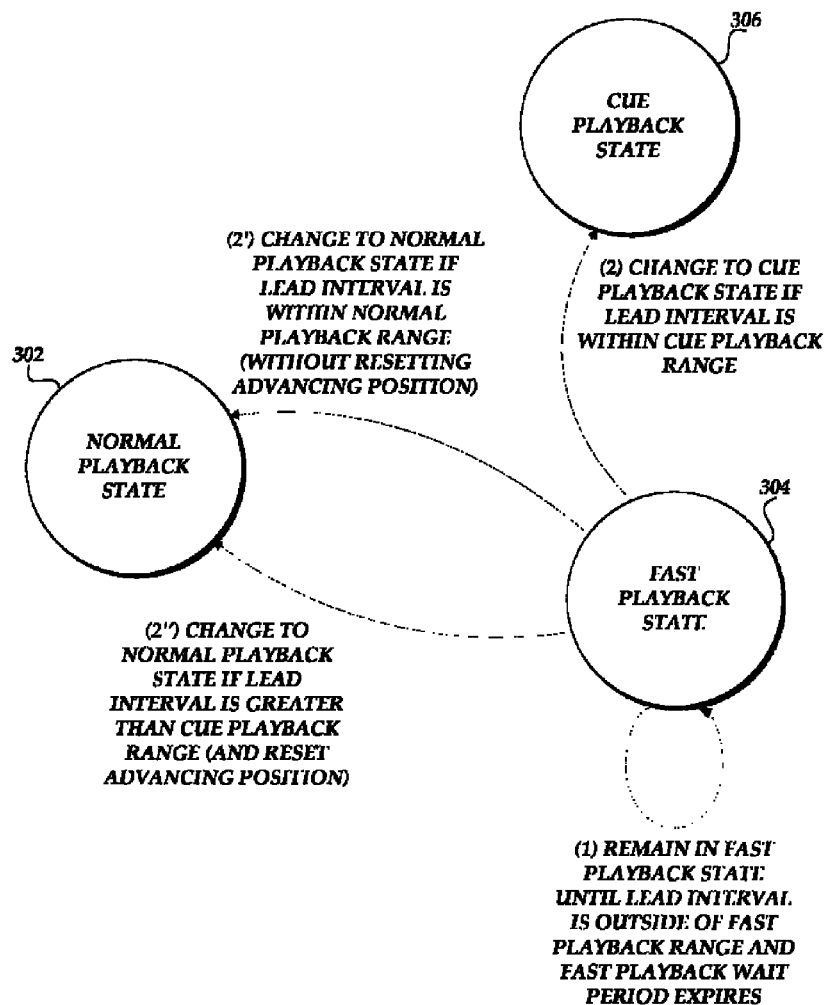
Figure 3C:
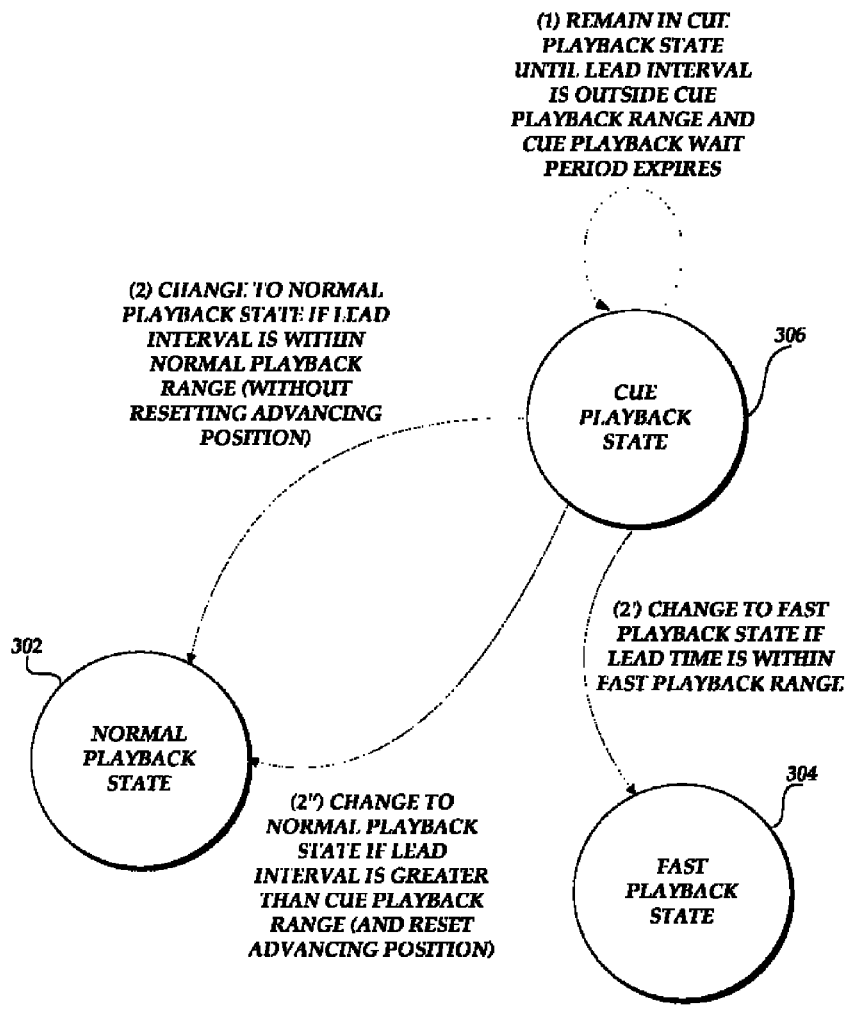

FIGS. 3A-3C are state diagrams depicting illustrative transitions between various playback states for the output of companion content on the computing device 200 shown in FIG. 2. The states referenced in FIGS. 3A-3C represent playback states of synchronized companion content as discussed above. As illustratively described in these figures, a set of playback states may include a normal playback state 302, a fast playback state 304, and a cue playback state 306. A normal playback state 302 may encompass playback of sequential content (e.g., audio or video content) and the synchronized advance of a pointer to companion visual content (e.g., textual content), at a speed substantially similar to an original speed at which the sequential content was recorded or intended to be played. For the purposes of example, the normal playback state 302 will be assumed to be the default playback state. A fast playback state 304 represents a state in which the rate at which the sequential content is output and the corresponding pointer to visual content is advanced is increased. Illustratively, a fast playback state may thus allow a user to fast forward through the playback and synchronized display of companion content. In one embodiment, the pitch of the audio content may be kept constant during fast playback. In an alternate embodiment, the pitch of the audio content may be allowed to vary with playback speed. A cue playback state 306 indicates a rapid or accelerated playback state in which the rate at which the sequential content is output and at which the corresponding pointer to visual content is advanced is further increased, and only short fragments of the sequential content are output in order to maintain intelligibility and allow the user to judge her location in the sequential content. For the purpose of these illustrative figures, the sequential companion content may be assumed to be audio content, and the visual companion content may be assumed to be textual content.

FIG. 3A depicts illustrative state changes from a normal playback state 302 to a fast playback state 304 or a cue playback state 306. FIG. 3A begins in normal playback state 302. For the purposes of illustration, we may assume that computing device 200 is thus outputting audio content at a normal speed, and is maintaining synchronization between an advancing position of the audio content and an advancing position in corresponding textual content. With reference to the example illustrated in FIG. 1, as a user reads textual content presented by the computing device 200, the user may indicate a location in the textual content using a pointer such as her finger or a stylus. The computing device 200 may then calculate a lead interval between the advancing position in the textual content and the location of the pointer to the textual content as obtained through an input interface (e.g., the location of the user's finger or stylus). As discussed above, the lead interval may correspond to a distance, a number of words, letters or other textual features, or a time required to output the textual content between the advancing position in the textual content and the location of the pointer to the textual content.

Returning to the FIG. 3A, the computing device 200 will remain in the normal playback state 302 until the lead interval satisfies a threshold value (e.g., exceeds a normal playback range) and a period of time corresponding to a normal playback wait period expires. The normal playback range may be defined in terms of one or more threshold values in units matching the lead interval. For example, the normal playback range may correspond to a range between threshold values defined by numbers of words or characters in a portion of textual content, obtained, determined, or estimated times required to read a certain quantity of textual content, or physical or abstract distances from the advancing position in the textual content. In various embodiments, these thresholds may be predefined by a user, hard coded, determined by a remote service, or dynamically determined by the computing device 200 based on past observations of user behavior.

The normal playback wait period represents a period of time in which a user can return the lead interval to within the normal playback range without a change in playback state. The normal playback wait period is therefore measured from the moment that the lead interval exceeds the normal playback range, and is reset if the lead interval drops back below the normal playback range before a state change occurs. The normal playback wait period may be predefined or dynamically determined in any of the same or different ways as the normal playback range. For the purpose of example, a brief slip of a finger across a touch screen or the jerk of a mouse may cause the location of the pointer to the textual content to move dramatically, and may therefore cause the lead interval to exceed the normal playback range. However, if the finger or mouse is returned to within the normal playback range before the normal playback wait period expires, computing device 200 may continue in a normal playback state. This normal playback wait period may therefore reduce accidental changes in playback state due to rapid or unsteady movements. If the pointer to the textual content stays within the normal playback range, computing device 200 may also continue in a normal playback state. The normal playback wait period may be predefined by a user or computing device 200, determined by a remote service, or dynamically determined by the computing device 200 based on past observations of user behavior.

As the pointer to the textual content moves away from the advancing position in the textual content (e.g., if the user is moving her finger rapidly across the touch screen), the lead interval may exceed the normal playback range, as described above. If the lead interval exceeds the normal playback range for a period of time greater than the normal playback wait period, a playback state change may occur. The state change may be determined based on the position of the pointer to the textual content and the corresponding lead interval at the moment that the normal playback wait period is exceeded. For the purpose of example, assume that the computing device 200 has a fast playback range defined by one or more thresholds and corresponding to a fast playback state and a cue playback range defined by one or more thresholds and corresponding to a cue playback state as discussed above with reference to FIG. 1. Illustratively, the fast playback range and cue playback range may be defined in terms of one or more thresholds in units matching the lead interval as described above with reference to the normal playback range. If the lead interval is within the fast playback range, the state changes from normal playback state 302 to fast playback state 304. If the lead interval is within the cue playback range, the state changes to cue playback state 306. If the lead interval exceeds the cue playback range, the computing device 200 jumps forward to the position of the pointer to the textual content and resumes playback in normal playback state 302. When jumping forward to the position of the pointer to the textual content, the computing device 200 may reset the position of the advancing position in the textual content to the position of the pointer to the textual content, and may continue in a normal playback state from a location in the audio content corresponding to the new advancing position in the text.

FIG. 3B depicts illustrative state changes from a fast playback state 304 to a normal playback state 302 or a cue playback state 306. FIG. 3B begins from fast playback state 304. In this state, the speed at which the audio content is being played back to the user has been increased because the user has skipped ahead in the textual content as indicated by the location of a pointer to the textual content obtained through an input interface (e.g., the location of the user's finger or stylus). If the lead interval between the advancing position in the textual content and the location of the pointer to the textual content satisfies a threshold value (e.g., exceeds or drops below the fast playback range, as described above) for longer than a fast playback wait period, a state change may occur; otherwise, playback in the fast playback state 304 continues. As discussed above with reference to the normal playback range, the fast playback range may be defined in terms of one or more threshold values in units matching the lead interval. For example, the fast playback range may correspond to a range between threshold values defined by numbers of words or characters in a portion of textual content, calculated or estimated times required to read a certain quantity of textual content, or physical or abstract distances from the advancing position in the textual content. In various embodiments, these thresholds may be predefined by a user, hard coded, determined by a remote service, or dynamically determined by the computing device 200 based on past observations of user behavior.

The fast playback wait period represents a period of time in which a user can return the lead interval to within the fast playback range without a change in playback state. The fast playback wait period is therefore measured from the moment that the lead interval exceeds the fast playback range, and is reset if the lead interval drops back below the fast playback range before a state change occurs. The fast playback wait period may be predefined or dynamically determined in any of the same or different ways as the fast playback range. One of skill in the relevant art will appreciate that the fast playback wait period may be the same or different than the normal playback wait period described above and may be predefined by a user or computing device 200, determined by a remote service, or dynamically determined by the computing device 200 based on past observations of user behavior.

If the lead interval exceeds or drops below the fast playback range for longer than the fast playback wait period, a state change may occur. If the lead interval is below the fast playback range when the fast playback wait period expires (e.g., because the user has moved her finger or stylus closer to the advancing position in the textual content), the computing device 200 changes from fast playback state 304 to normal playback state 302. Illustratively, this allows a user to return to a normal playback state 302 at a current position in a text after "fast forwarding" through a section of content. If the lead interval is within a cue playback range above the fast playback range when the fast playback wait period expires (e.g., because the user has moved her finger or stylus farther away from the advancing position in the textual content), the computing device 200 changes to cue playback state 306. Illustratively, this allows a user to increase the rate at which she is progressing through the companion textual and audio content, for example in order to quickly move through a less interesting portion of an eBook. If the lead interval exceeds the cue playback range when the fast playback wait period expires, the computing device 200 sets the advancing position in the textual content and the corresponding position within the companion audio content to correspond to the location of the pointer in the textual content. The computing device 200 then resumes output of the audio content and the corresponding advancement of the position in the companion textual content in normal playback state 302. Illustratively, this allows a user to jump ahead to a later section of an eBook by moving a finger or stylus far ahead of the current advancing position in the textual content.

FIG. 3C depicts illustrative state changes from a cue playback state 306 to a normal playback state 302 or a fast playback state 304. FIG. 3C begins from cue playback state 306. In this state, only short fragments of the audio content are output in order to maintain intelligibility and allow the user to judge her location in the audio content. If the lead interval between the advancing position in the textual content and the location of the pointer to the textual content satisfies a threshold value (e.g., exceeds or drops below a cue playback range) for longer than a cue playback wait period, a state change may occur; otherwise, rapid or accelerated playback in the cue playback state 306 continues, allowing a user to rapidly move through a section of textual content and companion audio content. As discussed above with reference to the fast and normal playback ranges, the cue playback range may be defined in terms of one or more threshold values in units matching the lead interval. For example, the cue playback range may correspond to a range between threshold values defined by numbers of words or characters in a portion of textual content, calculated or estimated times required to read a certain quantity of textual content, or physical or abstract distances from the advancing position in the textual content. In various embodiments, these thresholds may be predefined by a user, hard coded, determined by a remote service, or dynamically determined by the computing device 200 based on past observations of user behavior.

The cue playback wait period represents a period of time in which a user can return the lead interval to within the cue playback range without a change in playback state. The cue playback wait period is therefore measured from the moment that the lead interval exceeds the cue playback range, and is reset if the cue interval drops back below the cue playback range before a state change occurs. The cue playback wait period may be predefined or dynamically determined in any of the same or different ways as the fast or normal playback ranges. One of skill in the relevant art will appreciate that the cue playback wait period may be the same or different than the normal playback wait period or fast playback wait period described above, and may be predefined by a user or computing device 200, determined by a remote service, or dynamically determined by the computing device 200 based on past observations of user behavior.

If the lead interval exceeds or drops below the cue playback range for longer than the cue playback wait period, a state change may occur. If the lead interval is within a normal playback range when the cue playback wait period expires (e.g., because the user has moved her finger or stylus close to the advancing position in the textual content), the computing device 200 changes from cue playback state 306 to normal playback state 302. Illustratively, this allows a user to return to a normal playback state 302 at a current position in a text after rapidly "fast forwarding" through a section of content. If the lead interval is within a fast playback range above the normal playback range when the cue playback wait period expires (e.g., because the user has moved her finger or stylus somewhat closer to the advancing position in the textual content), the computing device 200 changes to fast playback state 304. Illustratively, this allows a user to slow down the rate at which she is progressing through the companion textual and audio content, for example if she believes that she is getting close to a desired section of a text and wishes to decrease the speed at which she is "fast forwarding" through the audio content and companion textual content. If the lead interval exceeds the cue playback range when the cue playback wait period expires, the computing device 200 sets the advancing position in the textual content and the corresponding position within the companion audio content to correspond to the location of the pointer in the textual content. The computing device 200 then resumes output of the audio content and the corresponding advancement of the position in the companion textual content in normal playback state 302. Illustratively, this allows a user to jump ahead to a later section of an eBook by moving a finger or stylus far ahead of the current advancing position in the textual content.

Changing playback states in response to a lead interval or other user input thus allows a user to control synchronized playback of visual and audio content through an easy-to-use and intuitive interface. One of skill in the relevant art will appreciate that any number of playback states may be used without departing from the scope of the present disclosure. For example, various embodiments may include fewer playback states, or may include additional levels of accelerated or decelerated playback. Additionally, it will be appreciated that any threshold or combination of thresholds may be used to define the various playback ranges and playback wait periods described above. For example, satisfying a threshold value may include exceeding or dropping below any predefined or dynamically determined value, or entering or leaving any range of values. As an additional example, transitions may be immediate without wait periods. In a further embodiment, one or more transitions may be eliminated and synchronized playback speed may at times vary directly with a lead interval. For the purpose of example, a transition from normal playback state 302 to fast playback state 304 may occur as described above; however, once in a fast playback state 304 the speed at which the audio content is output and the corresponding pointer to the textual content is advanced may directly increase with the length of the lead interval. In a still further embodiment, the absence of a location of a pointer to the textual content may trigger a change in playback state under certain circumstances. For example, a user lifting a finger off a touch screen or moving a mouse cursor outside of a textual content presentation window for longer than a specified wait interval may cause playback to stop, or may automatically trigger a return to normal playback mode. In a still further embodiment, one or more attributes of the content other than, or in addition to, speed, may be varied as the content is being output. Such attributes may include, but are not limited to, volume, pitch, intelligibility, contrast, brightness, display size, or any other visual, auditory, or tactile attribute. Further embodiments of transitions between playback states are now described with reference to FIG. 4.

Figure 4:
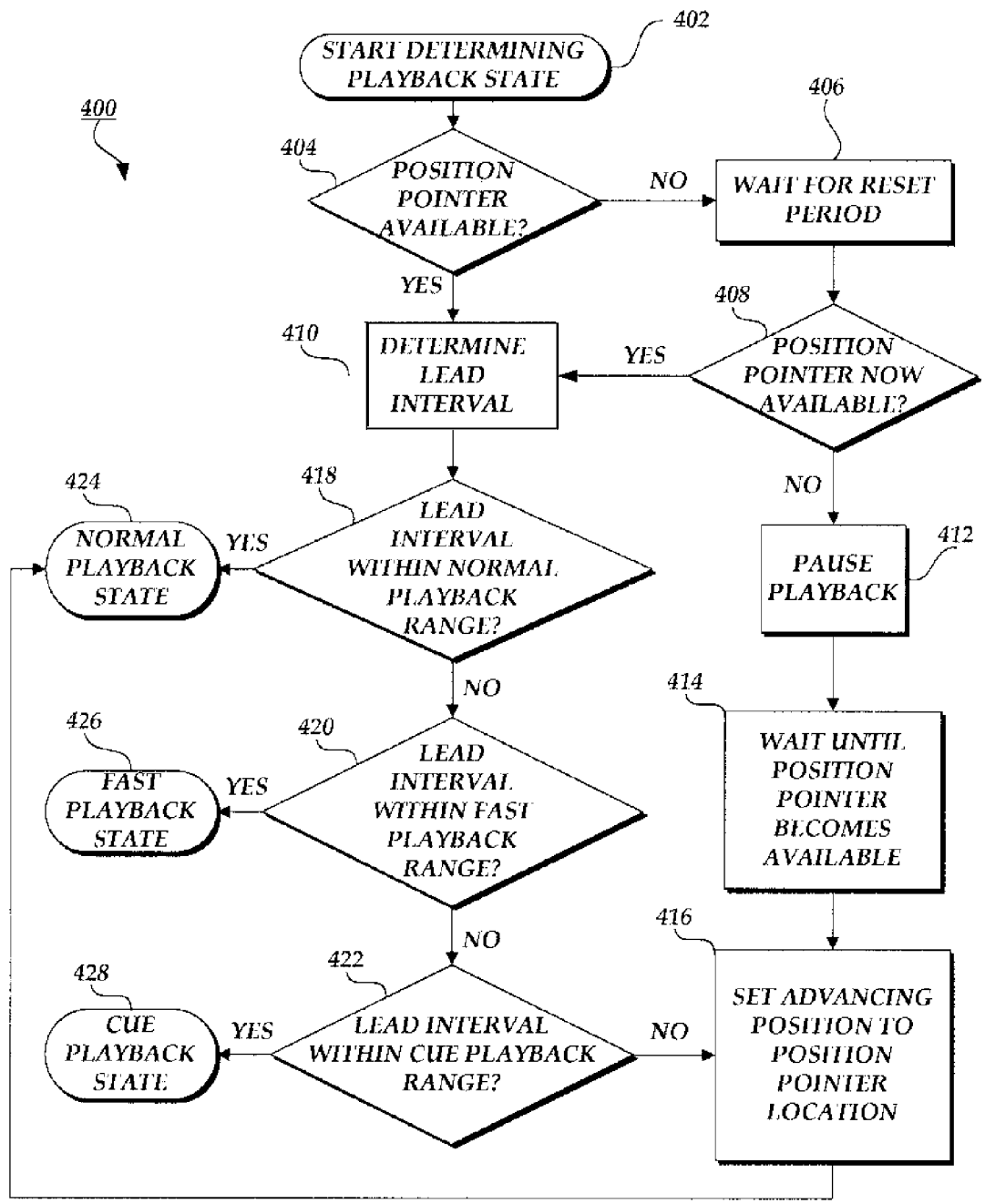
FIG. 4 is a flow diagram depicting an illustrative method for determining a playback state for the output of synchronized content.

FIG. 4 is a flow diagram depicting an illustrative method 400 for determining a playback state for the output of synchronized content. The method 400 may illustratively be implemented by the user control component 216 as described above with reference to FIG. 2. Method 400 for determining a playback state begins at block 402 in response to a state change being triggered. For example, with reference to FIG. 3A-3C, method 400 for determining a playback state may be triggered by the lead interval falling outside of a playback range for longer than a playback wait period. In other embodiments, method 400 may be triggered by any other event causing a change in playback state, or may be automatically repeated at intervals or continuously repeated in order to detect and change state in reaction to user input as it occurs.

At decision block 404, the computing device 200 checks to determine whether a pointer to the textual or other visual content is available. For purposes of illustration, the pointer may correspond to the pointer indicated by the representation 106 of a location of a pointer to the textual content with reference to FIG. 1 above. As discussed above with reference to FIGS. 3A-3C, in some embodiments, a pointer to the textual content may be unavailable at certain times based on the configuration of the device, the implementation of the control interface, or properties of the input components or input devices. For example, in some embodiments of a touch screen, a pointer to the textual content may not be available when a user lifts a finger from the screen. If a pointer to the textual content is not available, the method 400 moves to block 406 and waits for a period of time corresponding to a reset period. This reset period may be several seconds, zero seconds, or any other time period, and may be predefined by a user, hard coded, set by an administrator or remote service, or dynamically determined based on observation of past user behavior. At the end of the reset period, the computing device 200 determines whether the pointer to the textual content is now available at decision block 408. If the pointer to the textual content is now available at decision block 408, or was originally available at decision block 404, the computing device 200 advances to block 410 to determine a lead interval. In one embodiment, the computing device 200 may check once to determine whether the pointer to the textual content has become available. In other embodiments, the computing device 200 may constantly monitor for a reset period to determine whether the pointer to the textual content has become available, or may check a number of times at various intervals.

If the computing device 200 determines that the pointer to the textual content is still not available at block 408, the method 400 may advance to block 412 and pause output of the audio content and the corresponding advancement of the companion textual or visual content. In various alternate embodiments, playback may continue in a normal playback state, or may enter any other playback state based on the preferences of the user or on the basis of any other predefined setting. At block 414, the computing device 200 will wait until the pointer to the textual content becomes available. Once the pointer to the textual content becomes available, at block 416 the computing device 200 will set the advancing position in the textual content and the corresponding position within the companion audio content to correspond to the new location of the pointer to the textual content. The computing device 200 will then enter a normal playback state at termination block 424.

Returning to block 410, if the pointer to the textual content is available, the computing device 200 will determine a lead interval based on the location of the pointer to the textual content and the advancing position in the text or visual content. An illustrative embodiment of a method for determining a lead interval is discussed below with reference to FIG. 5. Once a lead interval has been determined at block 410, the routine will advance to decision block 418. At block 418, the computing device 200 will determine whether the lead interval is within a normal playback range. As discussed with reference to FIGS. 3A-3C, the normal playback range may be predefined or may be dynamically determined based on a number of different factors. If the lead interval is determined to be within a normal playback range, the computing device 200 enters a normal playback state at termination block 424 and the method 400 ends.

If the lead interval is not determined to be within a normal playback range, the routine advances to decision block 420 and determines whether the lead interval is within a fast playback range. As discussed with reference to FIGS. 3A-3C, the fast playback range may be predefined or may be dynamically determined based on a number of different factors. If the lead interval is determined to be within a fast playback range, the computing device 200 enters a fast playback state at termination block 426 and the method 400 ends. If the lead interval is not determined to be within a fast playback range, the routine advances to decision block 422 and determines whether the lead interval is within a cue playback range. As discussed with reference to FIGS. 3A-3C, the cue playback range may be predefined or may be dynamically determined based on a number of different factors. If the lead interval is determined to be within a cue playback range, the computing device 200 enters a cue playback state at termination block 428 and the method 400 ends. If the lead interval is outside of the cue playback range, the computing device 200 will set the advancing position in the textual content and the corresponding position within the companion audio content to correspond to the new location of the pointer to the textual content. The computing device 200 will then enter a normal playback state at termination block 424.

One of skill in the relevant art will appreciate that in other embodiments there may be any number of playback states corresponding to accelerated or decelerated methods of playback. In addition, various embodiments may eliminate one or more transitions and/or vary playback speed directly with a lead interval.

Figure 5:
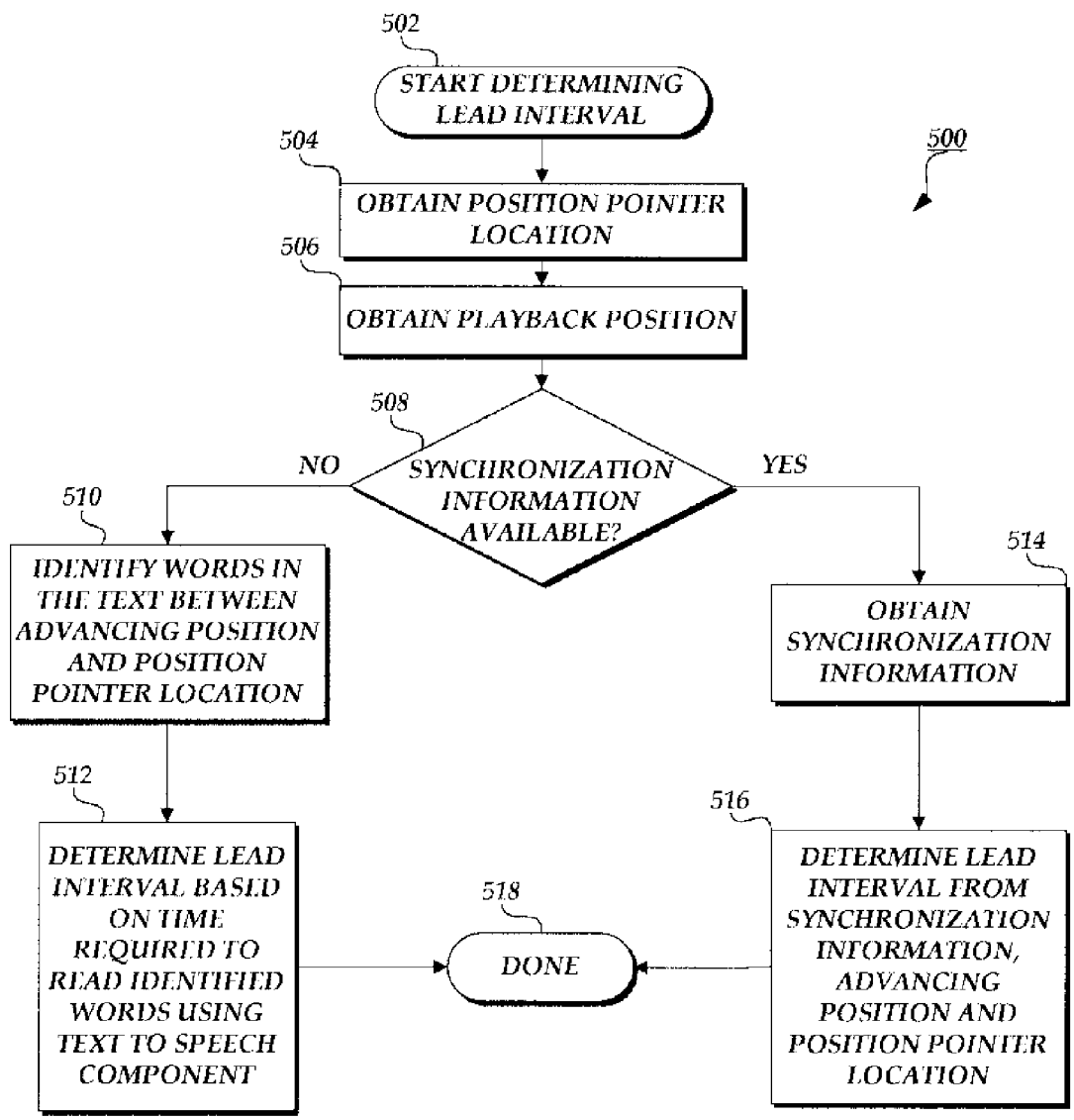
FIG. 5 is a flow diagram depicting an illustrative method for determining a lead interval between a playback position and a pointer location.

With reference now to FIG. 5, FIG. 5 is a flow diagram depicting an illustrative method 500 for determining a lead interval between an advancing position in a text and the location of a pointer to textual content. This method may illustratively be implemented by the user control component 216 as described above with reference to FIG. 2. Method 500 begins at block 502 in response to a request for determination of a lead interval. For example, method 500 may be executed in response to determining a lead interval in block 410 of the illustrative method 400 of FIG. 4. In response to the request for determination of the lead interval, at block 504 the computing device 200 obtains a location of a pointer to textual content based on information received from the input device(s) 224. As discussed with reference to FIG. 1 above, the location of a pointer to textual content may be obtained from any of a number of input devices 224. At block 506 the computing device 200 obtains an advancing position in the textual content corresponding to the advancing position in the audio content during output.

At decision block 508 the computing device 200 determines whether there is synchronization information available for the synchronized audio and textual content. This synchronization information may correspond to a synchronization information file and may be obtained from any of a number of local or remote sources. For example, the computing device 200 may store a synchronization information file in a memory location or on a local storage device. In another embodiment, the computing device 200 may obtain synchronization information from a remote storage device or stream synchronization information from a remote network location. If synchronization information is available, the computing device 200 obtains the synchronization information at block 514. At block 516 the computing device 200 determines a lead interval from the synchronization information, the advancing position in the textual content, and the location of a pointer to textual content.

Specifically, for the purposes of illustration, a lead interval may be determined as the difference between an advancing position in visual content and the location of a pointer to the visual content. For example, in one embodiment, the lead interval may correspond to a length of time required, based on the synchronization information, to play back audio content corresponding to the intervening content between an advancing position in textual content and the location of a pointer to the textual content. In another embodiment, as discussed above, the lead interval may correspond to a number of words, letters, syllables, sentences, or other textual features between the advancing position in the textual content and the location of a pointer to the textual content. In a further embodiment, the lead interval may correspond to a physical distance between the advancing position in the textual content and the location of a pointer to the textual content. Illustratively, the physical distance may correspond to an absolute distance or to a positive or negative distance from the advancing position in the textual content. For example, with reference to textual content, if the location of a pointer to the textual content is located behind the advancing position in the textual content, the computing device 200 may determine a negative lead interval. In some embodiments, this may cause the illustrative computing device 200 to reverse playback direction. As another illustrative example, in reference to graphical content, a lead interval may be determined based on the absolute physical distance between an advancing position in the graphical content (e.g., a first location on a painting corresponding to an advancing position in the output of companion audio or video content) and the location of a pointer to the graphical content (e.g., a second location on the painting). In one embodiment, the computing device 200 may accordingly accelerate or slow playback of sequential content (e.g., audio content or video content) based on the lead interval. At block 518 the method 500 ends, returning the determined lead interval to the method 400 of FIG. 4.

If the computing device 200 determines that synchronization information was not available at block 508, the routine proceeds to block 510. At block 510, the computing device 200 identifies the words in the textual content between the advancing position in the textual content and the location of a pointer to the textual content obtained from the input device(s) 224. At block 512 the computing device 200 determines a lead interval based on the time required to read the words in the identified text using the text-to-speech component 220. The time required to read identified words may be determined by a number of different algorithms or methods. In one embodiment, the text-to-speech component 220 generates audio content corresponding to the textual content between the advancing position in the textual content and the location of a pointer to the textual content. In another embodiment, the audio content corresponding to the textual content may be pre-generated before playback of the audio content in order to calculate a length of time required to output audio content corresponding to the textual content. In another embodiment, the text-to-speech component 220 calculates a lead interval based on the length of time required to output the textual content without actually generating an audio signal. In still another embodiment, the computing device 200 may estimate a length of time required to output audio content corresponding to the textual content based on a number of factors including a number of words, an average word length, a number of sentences, an average sentence length, a number of syllables, a number of phonemes, a number of letters, a number of spaces, or any other characteristic of the words in the text between the advancing position in the textual content and the location of a pointer to the textual content. In one embodiment the text-to-speech component 220 may generate synchronization information based on the determined length of time required to output audio content corresponding to the textual content. Accordingly, the text-to-speech component 220 may store this generated synchronization information in a storage location such as computer readable medium drive 208 to be utilized during a subsequent output and display of the companion content. In various other embodiments, the computing device 200 may determine a lead interval based on a number of words, letters, characters, syllables, or a physical distance between the advancing position in the textual content and the location of a pointer to the textual content. At block 518 the method 500 ends having determined the lead interval. Illustratively, the lead interval may now be used as the basis for changing or controlling a playback state as described with reference to FIG. 4 above.

Figure 6:
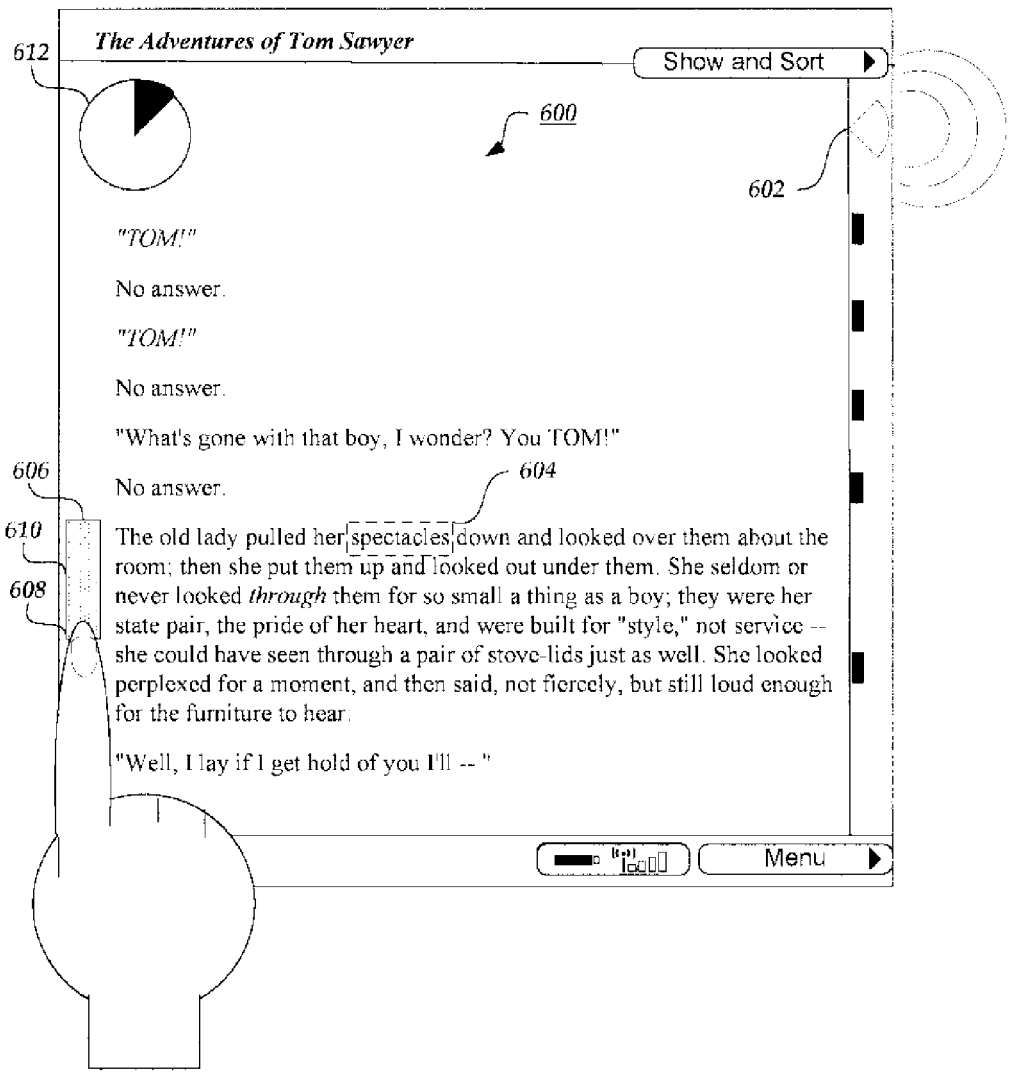
FIGS. 6-8 depict illustrative control interfaces that may be used to manage synchronized playback of content.

FIG. 6 depicts an illustrative control interface 600 generated on a computing device 200 that may be used to manage synchronized playback of content. For purposes of illustration, the control interface 600 may be generated for display on a computing device 200 such as the computing device 200 discussed with reference to FIG. 2 above. The control interface 600 may include a representation 604 of a first advancing position in textual content that corresponds to a current position in companion audio content as the audio content is played back through one or more output devices 222 represented by icon 602. The representation 604 of the first advancing position in the textual content may be updated as the companion audio content is played back in order to maintain synchronization between the representation 604 of the first advancing position in the textual content and the advancing position of the audio content during output. The representation 604 of the first advancing position in the textual content may correspond to any of a number of levels of granularity within the textual content as discussed above with reference to FIG. 1. For example, the representation 604 of the first advancing position in the textual content may be indicated by a visible cue such as a cursor, line, or emphasis surrounding or indicating a corresponding word. The control interface 600 may further include a representation 606 of a second advancing position in the textual content. This representation 606 of a second advancing position in the textual content may indicate an advancing position in the textual content corresponding to the current position in the companion audio content with a different granularity than the representation 604 of the first advancing position in the textual content. For example, the representation 604 of the first advancing position in the textual content may indicate a word of textual content corresponding to the word currently being output by the companion audio content, and the second advancing position 606 in the textual content may indicate a line of textual content corresponding to the line of textual content currently being output by the companion audio content.

The control interface 600 may additionally include a representation 608 of a location of a pointer to the textual content. The control interface 600 may obtain the location of the pointer to the textual content corresponding to the representation 608 from one or more of the input devices 224 of the computing device 200. For example, the location of the pointer to the textual content may be obtained from a touch screen tracking the location of a user's finger or stylus. The control interface 600 may display the representation 608 of the location of the pointer to the textual content through any visual or tactile cue, cursor, or emphasis.

The computing device 200 may further display a highlighted bar 610 corresponding to a lead interval between the location of the pointer to the textual content corresponding to representation 608 and the second advancing position in the textual content corresponding to representation 606. In some embodiments, a lead interval may also be indicated by any of a number of visual cues including a box, a line, a visual animation, or any other visual cue signifying an interval. In other embodiments, a lead interval may be represented by a formatting change or other visual effect. In still further embodiments, the lead interval may be represented as a numeric value or may be indicated by reproducing the text within the lead interval at an alternate location on the screen.

Referring again to FIG. 6, the control interface 600 may further include a playback transition indicator 612. This playback transition indicator 612 may provide a visual or tactile indication of a current playback state, and may further provide advance indication of an approaching point of transition, such as a threshold between playback states. Illustratively, in the context of the above example, if the computing device 200 is in a normal playback state as discussed above with reference to FIG. 1, the playback transition indicator 612 may provide an indication of how close the lead interval indicated by highlighted bar 610 is to satisfying a threshold corresponding to a fast or cue playback state. The playback transition indicator 612 may include, but is not limited to a bar, a dial, a numerical value, a transparency effect or other visual animation, or any other visual or tactile indication of a user's nearness to a threshold or other playback state transition point.

In the example illustrated in FIG. 6, the playback transition indicator 612 is a dial that fills as the user increases the lead interval corresponding to the highlighted bar 610. When the lead interval approaches a threshold corresponding to a transition in playback state, such as a threshold between a normal playback state to a fast playback state, the playback transition indicator 612 may display a nearly filled dial. In some embodiments, the interval approaching within a predefined distance of a threshold may trigger an additional visual or tactile effect, including but not limited to a change in the color of the playback transition indicator 612 or the highlighted bar 610, a change in size of the playback transition indicator 612, a visual animation or blinking effect applied to the playback transition indicator 612 or the highlighted bar 610, a vibration of the computing device 200, or any other indication that a change in playback state is near. One skilled in the relevant art will appreciate that the illustrative interface described above is provided for purposes of example only, and that embodiments of the interface may implement any number or combination of the features described with reference to FIG. 6. Control interface 600 may be implemented on any number of devices as described above with reference to FIG. 2.

Figure 7:
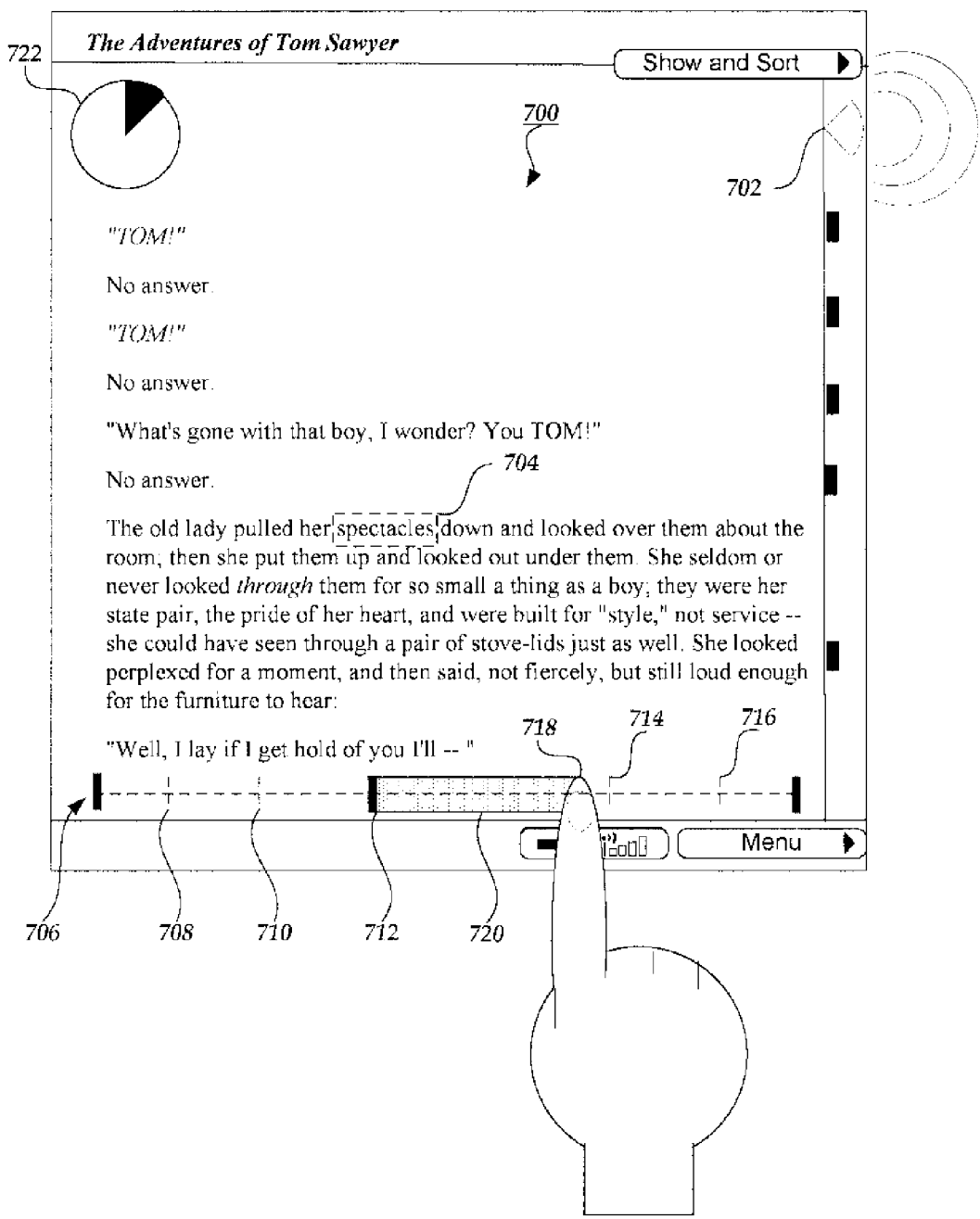

FIG. 7 depicts an illustrative control interface 700 generated on a computing device 200 that may be used to manage synchronized playback of content. The control interface 700 may include a representation 704 of an advancing position in textual content that corresponds to a current position in companion audio content as the audio content is output through one or more output devices 222 represented by icon 702. The representation 704 of the advancing position in the textual content may be updated as the companion audio content is played back in order to maintain synchronization between the representation 704 of the advancing position in the textual content and the advancing position of the audio content during output. The representation 704 of the advancing position in the textual content may correspond to any of a number of levels of granularity within the textual content as discussed above with reference to FIG. 1. For example, the representation 704 of the advancing position in the textual content may be indicated by a visible cue such as a cursor, line, or emphasis surrounding or indicating a corresponding word.

The control interface 700 may additionally include a speed indicator 706 indicating a current rate of audio content output and a corresponding rate at which the pointer to the companion textual content is advanced. This speed indicator 706 may include representations of a number of speed thresholds 708, 710, 712, 714, and 716. These speed thresholds may correspond to the thresholds of various playback states as described below.

The control interface 700 may additionally include a representation 718 of a location of a pointer to speed indicator 706. Illustratively, the control interface 700 may obtain the location of the pointer corresponding to representation 718 from one or more of the input devices 224 of the computing device 200. For example, the location of the pointer to speed indicator 706 may be obtained from a touch screen tracking the location of a user's finger or stylus. The control interface 700 may display the representation 718 of the location of the pointer to speed indicator 706 through any visual or tactile cue, cursor, or emphasis.

The control interface 700 may further display a highlighted bar 720 indicating an interval between a neutral speed threshold 712 and representation 718 of the location of the pointer to speed indicator 706. In some embodiments, the interval corresponding to highlighted bar 720 may also be indicated by any of a number of other visual cues including a box, a line, a visual animation, or any other visual cue signifying an interval. In other embodiments, the interval may be represented by a formatting change or other visual effect. In still further embodiments, the interval may be represented as a numeric value or symbol indicating a playback state.

The computing device 200 may utilize the interval between the representation 718 of the location of the pointer to speed indicator 706 and the neutral speed threshold 712 to determine a playback state. For example, if the computing device 200 determines that the location of the pointer to speed indicator 706 satisfies a threshold value (e.g., is greater than the neutral speed threshold 712, but less than a fast speed threshold 714), the computing device 200 may proceed with the output and display of companion content in a normal playback state. If the location of the pointer to speed indicator 706 exceeds a fast speed threshold 714 the computing device 200 may enter a fast playback state. If the location of the pointer to speed indicator 706 further exceeds a cue speed threshold 716, the computing device 200 may enter a cue playback state. If the location of the pointer to speed indicator 706 satisfies an alternate threshold value (e.g., decreases below a neutral speed threshold 712), the computing device 200 may reverse or rewind output of the audio content and cause the representation 704 of the advancing position in the companion textual content to retreat or move backwards through the text in order to maintain synchronization with the reversing position of the audio content. If the location of the pointer to speed indicator 706 satisfies a further threshold value (e.g., further decreases past a fast rewind speed threshold 710), the computing device 200 may increase the rewind speed or reverse playback rate of the synchronized audio content and the corresponding rate of retreat of the representation 704 of the advancing position in the companion textual content. For the purpose of still further example, if the location of the pointer to speed indicator 706 satisfies a still further threshold value (e.g., decreases below a cue rewind speed threshold 708), the computing device 200 may still further increase the reverse playback rate of the synchronized audio content and the corresponding rate of retreat of the representation 704 of the advancing position in the companion textual content. One of skill in the relevant art will appreciate that in various alternate embodiments, speed indicator 706 may include any number of thresholds corresponding to one or more playback states. In a still further embodiment, interface 700 may determine a speed of audio content output and a corresponding rate at which the pointer to the textual content is advanced directly from a displacement between the neutral speed location 712 and the location of the pointer to speed indicator 706.

The control interface 700 may further include a playback transition indicator 722. This playback transition indicator 722 may provide a visual or tactile indication of a current playback state, and may further provide advance indication of an approaching point of transition, such as a speed threshold 708, 710, 712, 714, or 716 between playback states. Illustratively, in the context of the above example, if the computing device 200 is in a normal playback state as discussed above with reference to FIG. 1, the playback transition indicator 722 may provide an indication of how close the location of the pointer to speed indicator 706 is to a threshold of a fast or cue playback state. The playback transition indicator 722 may include, but is not limited to a bar, a dial, a numerical value, a transparency effect or other visual animation, or any other visual or tactile indication of a user's nearness to a speed threshold 708, 710, 712, 714, or 716 or other playback state transition point.

In the example illustrated in FIG. 7, the playback transition indicator 722 is a dial that fills as the user increases the interval represented by the highlighted bar 710. When the interval approaches a speed threshold 708, 710, 712, 714, or 716 corresponding to a transition in playback state, such as a fast speed threshold 714 between a normal playback state and a fast playback state, the playback transition indicator 722 may display a nearly filled dial. In some embodiments, the interval approaching within a predefined distance of a threshold may trigger an additional visual or tactile effect, including but not limited to a change in the color of the playback transition indicator 722 or the highlighted bar 720, a change in size of the playback transition indicator 722, a visual animation or blinking effect applied to the playback transition indicator 722 or the highlighted bar 720, a vibration of the computing device 200, or any other indication that a change in playback state is near. One skilled in the relevant art will appreciate that the illustrative interface described above is provided for purposes of example only, and that embodiments of the interface may implement any number or combination of the features described with reference to FIG. 7. Control interface 700 may be implemented on any number of devices as described above with reference to FIG. 2.

Figure 8:
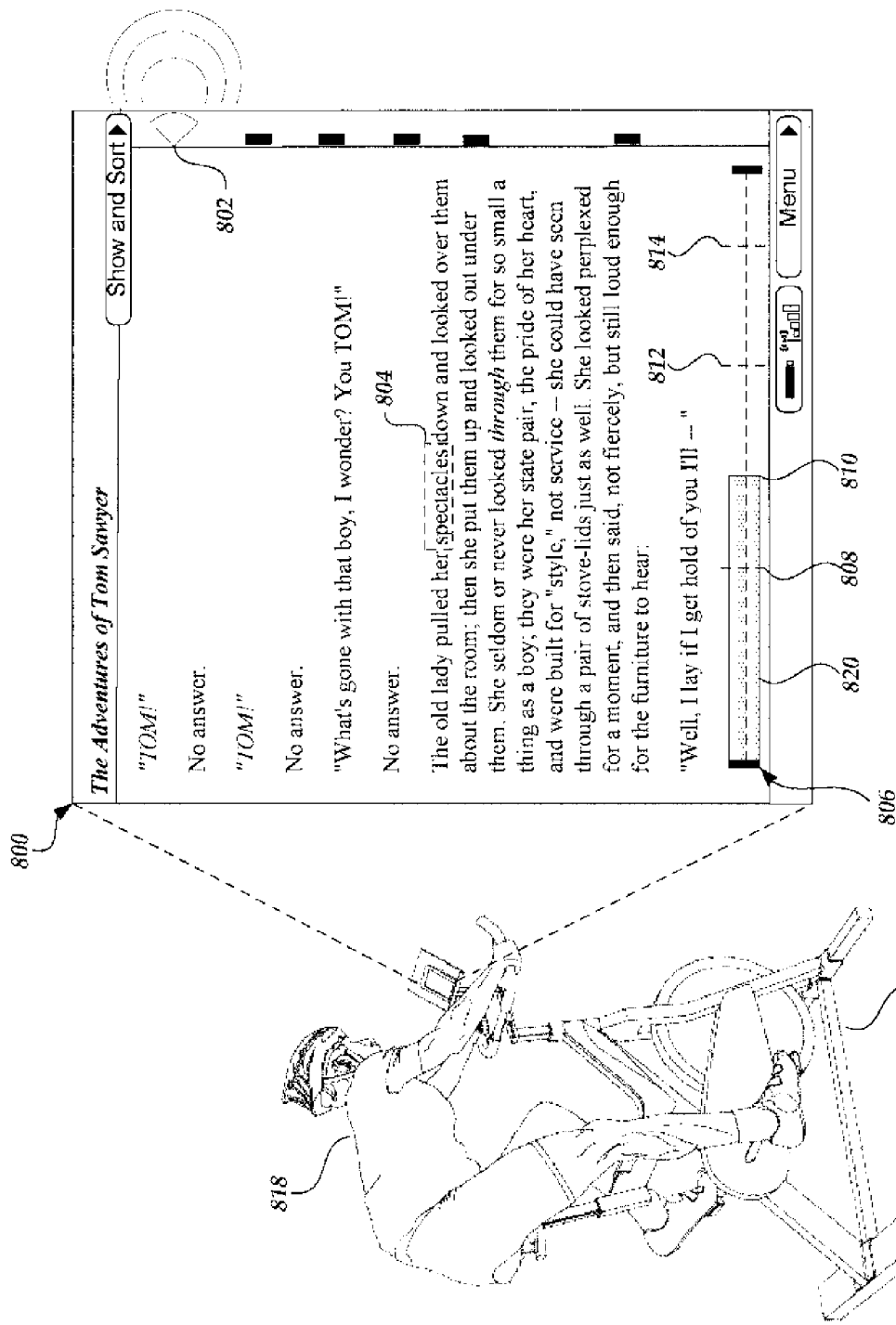

FIG. 8 depicts another illustrative control interface 800 displayed on a computing device 200 that may be used to control synchronized playback of content. The control interface 800 may include a representation 804 of an advancing position in textual content that corresponds to a current position in companion audio content as the audio content is output through one or more output devices 222 represented by icon 802. The representation 804 of the advancing position in the textual content may be updated as the companion audio content is played back in order to maintain synchronization between the representation 804 of the advancing position in the textual content and the advancing position of the audio content during output. The representation 804 of the advancing position in the textual content may correspond to any of a number of levels of granularity within the textual content as discussed above with reference to FIG. 1. For example, the representation 804 of the advancing position in the textual content may be indicated by a visible cue such as a cursor, line, or emphasis surrounding or indicating a corresponding word.

The control interface 800 may additionally include a speed indicator 806 indicating a current rate of audio content output and a corresponding rate at which the pointer to the companion textual content is advanced. This speed indicator 806 may include representations of a number of speed thresholds 808, 812, and 814. These speed thresholds may correspond to the thresholds of various playback states as described below.

The control interface 800 may additionally include a representation 810 of an input value displayed within speed indicator 806. The control interface 800 may display the representation 810 of the input value through any visual or tactile cue, cursor, or emphasis. Illustratively, the control interface 800 may obtain the input value corresponding to representation 810 from one or more input devices 224 of the computing device 200. In one embodiment, the input value may be obtained from a joystick or any other input device 224 capable of generating an input signal. In another embodiment, the input value corresponding to representation 810 may be generated by an input device 224 monitoring bodily function or exercise. For example, the input value corresponding to representation 810 may be obtained from any of a number of devices or components capable of monitoring the performance of a user including but not limited to a location monitor (e.g., a global positioning system device), performance monitor, pedometer, heart rate monitor, watch, smart shoe, or an exercise machine 816 monitoring the performance of a user 818. In one embodiment, the exercise machine 816 may monitor any aspect of the performance of user 818 as known in the art, including heart rate, speed, pace, score, difficulty, time exercising, energy spent or produced, or any other aspect of performance. The input value corresponding to representation 810 may be in any form, including but not limited to a positive or negative numerical value representing any of the above aspects of performance, or corresponding to the deviation of one of the above aspects of performance from a personal goal or zone of exercise. For example, the input value corresponding to representation 810 may represent a current pace on an exercise bicycle or other exercise machine 816. As another example, the input value corresponding to representation 810 may represent a difference between a goal of fifteen (15) miles per hour and the actual current pace on an exercise bicycle or other exercise machine. In various embodiments, the input value corresponding to representation 810 may indicate any combination of input factors that may be averaged or weighted based on predefined or dynamically determined settings. For example, the input value corresponding to representation 810 may correspond to an average number of calories burned in the preceding five minutes added to a difference between the user's actual heart rate and the threshold of a desired heart rate zone. One of skill in the relevant art will appreciate that any number of inputs may be provided to the computing device 200 for processing or determining the input value corresponding to representation 810 and that any necessary input determination or processing steps may be conducted by the computing device 200 or by the exercise machine 816 or other input device.

The control interface 800 may further display a highlighted bar 820 indicating an interval between the start of speed indicator 806 and representation 810 of the input value. In some embodiments, the interval corresponding to highlighted bar 820 may also be indicated by any of a number of other visual cues including a box, a line, a visual animation, or any other visual cue signifying an interval. In other embodiments, the interval may be represented by a formatting change or other visual effect. In still further embodiments, the interval may be represented as a numeric value or symbol indicating a playback state.

The computing device 200 may utilize the input value indicated by representation 810 to determine a playback state. For example, if the computing device 200 determines that the input value indicated by representation 810 satisfies one or more threshold values (e.g., is greater than a slow speed threshold 808, but less than a fast speed threshold 812), the computing device 200 may proceed with the output and display of companion content in a normal playback state. For the purpose of example, assume that the input value indicated by representation 810 corresponds to a heart rate of a user 818 obtained through exercise machine 816. Assume further for purposes of example that the range between the slow speed threshold 808 and the fast speed threshold 812 represents a desired heart rate zone. As discussed above with reference to FIGS. 3A-3C, in various embodiments, these thresholds may be predefined by a user, hard coded, determined by a remote service, or dynamically determined by the computing device 200 based on past observations of user behavior. For example, the computing device 200 may monitor and/or record past user performance at a task (e.g., an exercise routine), and may dynamically adjust performance thresholds based on such factors as an increasing level of performance, a desired performance goal, a preselected routine (e.g., a predefined workout regimen), or any other algorithm capable of calculating a modified threshold based on past user performance or behavior.

To continue the above example, if the user is maintaining a heart rate within the desired heart rate zone (e.g., between slow speed threshold 808 and fast speed threshold 812), the computing device 200 may maintain a normal playback state. This normal playback state indicates to the user 818 that his heart rate is within the desired heart rate zone. If the input value indicated by representation 810 exceeds a fast speed threshold 812 the computing device 200 may enter a fast playback state. For the purpose of the above example, the fast playback state may indicate to the user 818 that his heart rate is exceeding his desired heart rate zone and that he should therefore slow down. Illustratively, the fast playback state may correspond to a change in pitch or some other attribute of the audio content being output in order to reduce intelligibility and encourage the user to return to a normal playback state. If the input value indicated by representation 810 further exceeds a cue speed threshold 814, the computing device 200 may enter a cue playback state. For the purpose of the above example, the cue playback state may indicate to the user 818 that his heart rate is far exceeding his desired heart rate zone and that he should slow down immediately. Illustratively, the cue playback state may correspond to still further reduction in the intelligibility of the audio being output in order to encourage the user to return to a normal playback state. If the input value indicated by representation 810 satisfies an alternate threshold value (e.g., decreases below a slow speed threshold 808), the computing device 200 may slow output of the audio content and likewise slow the advance of the representation 804 of the advancing position in the companion textual content in order to maintain synchronization with the slowly advancing position of the audio content. For the purpose of the above example, the slow output and slowly advancing position in the companion textual content may indicate to the user 818 that his heart rate is beneath his desired heart rate zone and that he should work harder. Illustratively, the slow playback state may correspond to a drop in pitch or change in some other attribute of the audio content being output in order to reduce intelligibility and encourage the user to return to a normal playback state. One of skill in the relevant art will appreciate that in various alternate embodiments, speed indicator 806 may include any number of thresholds corresponding to one or more playback states. In a still further embodiment, interface 800 may determine a speed of audio content output and a corresponding rate at which the pointer to the textual content is advanced directly from an input value indicated by representation 810. One of skill in the relevant art will appreciate that in other embodiments there may be any number of playback states corresponding to accelerated, decelerated or interrupted methods of playback. In addition, various embodiments may eliminate one or more transitions and/or vary playback speed directly with an input value. In a still further embodiment, one or more attributes of the content other than, or in addition to, speed, may be varied as the content is being output. Such attributes may include, but are not limited to, volume, pitch, intelligibility, contrast, brightness, display size, or any other visual, auditory, or tactile attribute.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a data store storing at least a portion of sequential content and a corresponding portion of visual content; and
a processor in communication with the data store, the processor configured with specific computer-executable instructions to at least:
during output of the sequential content, display an output indicator within the visual content indicating a position within the visual content corresponding to a current output position of the sequential content, wherein the output indicator advances during output of the sequential content;
obtain an input pointer that references an input position within the visual content, wherein the input position is distinct from the position indicated by the output indicator;
during advancement of the output indicator, determine a distance between the input position and the position indicated by the output indicator; and
modify the output of the sequential content based at least in part on the determined distance between the input position and the position indicated by the output indicator.

2. The system of claim 1, wherein the processor is further configured to at least generate the sequential content based at least in part on the visual content.

3. The system of claim 1, wherein the visual content comprises at least one of a text, a music score, a picture or sequence of pictures, a diagram, a chart, or a presentation.

4. The system of claim 1, wherein the sequential content comprises at least one of spoken audio, music, or video.

5. The system of claim 1, wherein the processor is further configured to at least modify the output of the sequential content by increasing or decreasing a speed at which the sequential content is output.

6. The system of claim 5, wherein increasing the speed at which the sequential content is output includes skipping output of one or more segments of the sequential content.

7. The system of claim 5, wherein the sequential content comprises audio content, and a current pitch of the audio content is maintained during increasing or decreasing the speed at which the sequential content is output.

8. A computer-implemented method comprising
causing output of a sequential content and a visual content, wherein output of the visual content is synchronized to output of the sequential content;
causing display within the visual content of an output indicator, wherein the output indicator advances during output of the sequential content and indicates a position within the visual content corresponding to a current output position of the sequential content;
causing reception of an input pointer referencing an input position within the visual content that is distinct from the position indicated by the output indicator; and
during advancement of the output indicator, causing output of the sequential content to be modified based at least in part on a distance between the position indicated by the output indicator and the input position.

9. The computer-implemented method of claim 8, wherein the distance between the input position and the position indicated by the output indicator is determined based at least in part on a length of time required, at a current output speed, to alter the current output position of the sequential content to correspond to the received input pointer.

10. The computer-implemented method of claim 8, wherein the output of the visual content is synchronized to the output of the sequential content based at least in part on synchronization information.

11. The computer-implemented method of claim 8, wherein the input position corresponds to at least one of a word, syllable, letter, sentence, line, paragraph, chapter, stanza, section, or column in the visual content.

12. The computer-implemented method of claim 8, wherein the input pointer is obtained from at least one of a touchscreen, a mouse, a stylus, a remote control, a video game controller, or a motion detector.

13. The computer-implemented method of claim 8, wherein modifying output of the sequential content comprises at least one of:
outputting the sequential content at a first rate when the distance between the input position and the position indicated by the output indicator satisfies a first threshold value for a first predetermined length of time;

outputting the sequential content at a second rate when the distance between the input position and the position indicated by the output indicator satisfies a second threshold value for a second predetermined length of time, wherein the second rate is faster than the first rate; or outputting the sequential content at a third rate when the distance between the input position and the position indicated by the output indicator satisfies a third threshold value for a third predetermined length of time, wherein the third rate is faster than the second rate.

14. The system of claim 13, wherein the first rate corresponds to at least one of a rate at which the sequential content was recorded, a rate determined by a user of the system, or a rate determined by a provider of the sequential content.

15. Non-transitory computer-readable storage media including computer-executable instructions that, when executed by one or more processors, cause the one or more processors to at least:

during output of a sequential content and a visual content, wherein output of the sequential content is synchronized to output of the sequential content, cause display within the visual content of an output indicator that advances during output of the sequential content and indicates a position within the visual content corresponding to a current output position of the sequential content;

causing input of an input pointer referencing an input position within the visual content that is distinct from the position indicated by the output indicator; and during advancement of the output indicator, causing output of the sequential content to be modified based at least in part on a distance between the position indicated by the output indicator and the input position.

16. The non-transitory computer-readable storage media of claim 15, wherein the computer-executable instructions further cause the one or more processors to output a visual cue of the distance between the input position and the position indicated by the output indicator.

17. The non-transitory computer-readable storage media of claim 16, wherein an appearance of the visual cue is altered based at least on part on whether the distance between the input position and the position indicated by the output indicator satisfies a threshold value.

18. The non-transitory computer-readable storage media of claim 15, wherein the computer-executable instructions further cause the one or more processors to determine that the distance between the input position and the position indicated by the output indicator satisfies a threshold value.

19. The non-transitory computer-readable storage media of claim 18, wherein the threshold value is determined based at least in part on input by a user.

20. The non-transitory computer-readable storage media of claim 18, wherein the computer-executable instructions further cause the one or more processors to determine that the distance between the input position and the position indicated by the output indicator satisfies the threshold value for a threshold time period.

21. The non-transitory computer-readable storage media of claim 15, wherein the computer-executable instructions further cause the one or more processors to update a current output position of the sequential content to a position in the sequential content corresponding to the input pointer.

* * * * *

UNITED STATES PATENT AND TRADEMARK OFFICE
CERTIFICATE OF CORRECTION

PATENT NO. : 9,792,027 B2
APPLICATION NO. : 14/507642
DATED : October 17, 2017
INVENTOR(S) : Guy Ashley Story, Jr.

Page 1 of 1

It is certified that error appears in the above-identified patent and that said Letters Patent is hereby corrected as shown below:

On the Title Page

In Column 2 (page 3, item (56)) at Line 5, Under Other Publications, change "eboo/" to --ebook/--.

In the Specification

In Column 13 at Line 33, Change "FIG." to --FIGS.--.

In the Claims

In Column 25 at Line 14, in Claim 14, change "system" to --method--.

Signed and Sealed this
Thirteenth Day of March, 2018

Andrei Iancu
*Director of the United States Patent and Trademark Office*